(12) United States Patent
Kajino

(10) Patent No.: US 8,240,679 B2
(45) Date of Patent: Aug. 14, 2012

(54) SUSPENSION SYSTEM FOR VEHICLE

(75) Inventor: Hidenori Kajino, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 197 days.

(21) Appl. No.: 12/673,831

(22) PCT Filed: Feb. 24, 2009

(86) PCT No.: PCT/JP2009/053804
§ 371 (c)(1),
(2), (4) Date: Feb. 17, 2010

(87) PCT Pub. No.: WO2009/107832
PCT Pub. Date: Sep. 3, 2009

(65) Prior Publication Data
US 2011/0025001 A1 Feb. 3, 2011

(30) Foreign Application Priority Data
Feb. 26, 2008 (JP) .................. 2008-044014

(51) Int. Cl.
*B60G 17/02* (2006.01)
(52) U.S. Cl. .................................. 280/5.515
(58) Field of Classification Search ........... 280/5.515, 280/5.516, 5.519, 5.502, 5.506, 5.507, 5.508, 280/5.509, 124.157, 124.158, 124.159, 124.16, 280/124.162
See application file for complete search history.

(56) References Cited

U.S. PATENT DOCUMENTS

| 4,491,207 A | * | 1/1985 | Boonchanta et al. ...... 188/266.5 |
| 4,674,767 A | * | 6/1987 | Kuroki et al. .............. 280/5.513 |
| 4,741,554 A | * | 5/1988 | Okamoto .................... 280/5.513 |
| 4,749,210 A | * | 6/1988 | Sugasawa .................. 280/5.519 |
| 5,072,965 A | | 12/1991 | Wada et al. |
| 5,293,969 A | | 3/1994 | Yamaoka et al. |
| 5,444,621 A | | 8/1995 | Matsunaga et al. |

(Continued)

FOREIGN PATENT DOCUMENTS
DE 40 17 421 A1 12/1990
(Continued)

OTHER PUBLICATIONS

International Search Report issued in Application No. PCT/JP2009/053804 on May 28, 2009.

(Continued)

*Primary Examiner* — Faye M. Fleming
(74) *Attorney, Agent, or Firm* — Oliff & Berridge, PLC

(57) ABSTRACT

A suspension system for a vehicle, including: (a) a suspension spring; (b) a hydraulic damper; (c) a displacement force generator disposed in parallel with the suspension spring and the damper; and (d) a controller including a damping-force controlling portion for controlling a damping force of the damper and a displacement-force controlling portion for controlling a displacement force of the displacement force generator. The displacement-force controlling portion is configured to execute a sprung-portion vibration damping control for controlling the displacement force, such that the generated displacement force acts as a damping force against sprung-portion vibration. The damping-force controlling portion is configured, upon execution of the sprung-portion vibration damping control, to execute a damping force reducing control for reducing the damping force that is to be generated by the damper, depending on an intensity of unsprung-portion resonance frequency vibration which occurs in the vehicle and which has a resonance frequency of the unsprung portion.

11 Claims, 18 Drawing Sheets

U.S. PATENT DOCUMENTS

| | | | |
|---|---|---|---|
| 7,900,938 B2* | 3/2011 | Sano | 280/5.502 |
| 7,949,446 B2* | 5/2011 | Koumura et al. | 701/38 |
| 2011/0025000 A1* | 2/2011 | Inoue et al. | 280/5.507 |
| 2011/0160960 A1* | 6/2011 | Kajino et al. | 701/38 |

FOREIGN PATENT DOCUMENTS

| | | |
|---|---|---|
| DE | 42 04 302 A1 | 8/1992 |
| DE | 42 19 012 A1 | 12/1992 |
| EP | 0 417 702 A2 | 3/1991 |
| EP | 1 870 266 A1 | 12/2007 |
| JP | A-3-132414 | 6/1991 |
| JP | U-6-55817 | 8/1994 |
| JP | A-2002-211224 | 7/2002 |
| JP | A-2002-218778 | 8/2002 |
| JP | A-2005-119563 | 5/2005 |
| JP | A-2006-082751 | 3/2006 |
| JP | A-2007-302194 | 11/2007 |

OTHER PUBLICATIONS

Oct. 25, 2011 Office Action issued in Japanese Patent Application No. 2008-044014 (with translation).

* cited by examiner

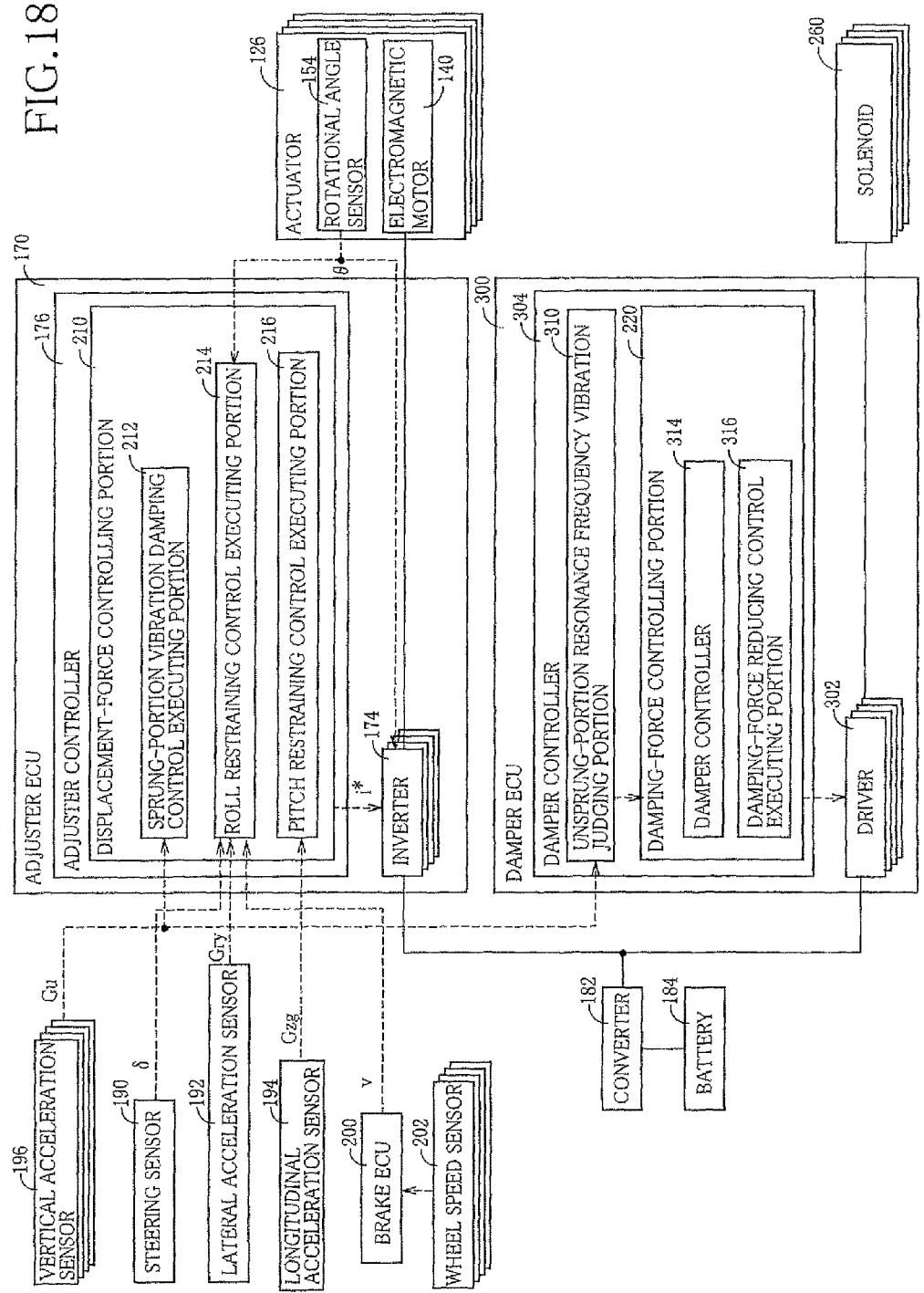

SUSPENSION SYSTEM FOR VEHICLE

TECHNICAL FIELD

The present invention relates to a suspension system for a vehicle, which is provided with a hydraulic damper and also a device including an electromagnetic motor and configured to generate, based on a force generated by the electromagnetic motor, a displacement force causing sprung and unsprung portions of the vehicle to be displaced toward or away from each other.

BACKGROUND ART

In recent years, there have been begun studies on a suspension system for a vehicle as disclosed in patent literatures as identified below, specifically, a system including a displacement force generator which includes an electromagnetic motor and which is provided in parallel with a suspension spring and a hydraulic damper. The displacement force generator is configured to generate, based on a force generated by the electromagnetic motor, a displacement force causing the sprung and unsprung portions to be displaced toward or away from each other, in a manner that enables the generated displacement force to be controllable. In this system, the generated displacement force is caused to act as a roll restraining force for restraining roll of a body of the vehicle, thereby making it possible to restrain the roll of the vehicle body.
[Patent Literature 1] JP-2002-218778A
[Patent Literature 2] JP-2002-211224A
[Patent Literature 3] JP-2006-82751A

DISCLOSURE OF THE INVENTION

(A) Outline of the Invention

The displacement force generator of the vehicle suspension system disclosed in the above-identified patent literatures is controlled, for example, to restrain roll of a body of the vehicle and accordingly contributes to provide stability of posture of the vehicle body. However, the system provided with such a displacement force generator is still in a developing stage and there is still room for improvements. That is, it is considered that the practicability of the system can be increased by various improvements applied to the system. The present invention was made in the light of the background art discussed above, and has an object of the invention to provide a vehicle suspension system having a high practicability.

This object may be achieved according to the principle of this invention, which provides a suspension system for a vehicle, including (a) a suspension spring, (b) a hydraulic damper disposed in parallel with the suspension spring, and configured to generate a damping force against displacement of sprung and unsprung portions of the vehicle relative to each other such that an amount of the damping force is changeable; and (c) a displacement force generator disposed in parallel with the suspension spring, and configured to generate a displacement force causing the sprung and unsprung portions to be displaceable toward and away from each other in a manner that enables the generated force to be controllable, wherein the suspension system configured to execute a sprung-portion vibration damping control for controlling the displacement force, such that the generated displacement force acts as a damping force against sprung-portion vibration which occurs in the sprung portion, and wherein the damping-force controlling portion is configured, upon execution of the sprung-portion vibration damping control, to execute a damping force reducing control for reducing the damping force that is to be generated by the damper, depending on unsprung-portion resonance frequency vibration which occurs in the vehicle and which has a resonance frequency of the unsprung portion, such that the damping force generated by the damper is made smaller in a low intensity situation in which an intensity of the unsprung-portion resonance frequency vibration is not higher than a threshold intensity value, than in a high intensity situation in which the intensity is higher than the threshold intensity value.

In the vehicle suspension system of the present invention, the generated displacement force is caused to act as the damping force against the sprung-portion vibration, so as to enable the sprung-portion vibration to be effectively damped. Since the damping force generated by the hydraulic damper (hereinafter referred to as "hydraulic damping force" where appropriate, so as to be distinguished from the displacement force which is generated by the displacement force generator and which acts as the damping force against the sprung-portion vibration) is caused to act against the displacement of the sprung and unsprung portions relative to each other, there is a risk that the sprung-portion vibration damping control executed by the displacement force generator would be affected by influence of the hydraulic damping force generated by the hydraulic damper. Therefore, for assuring performance of the sprung-portion vibration damping control, it might be desirable to reduce the hydraulic clamping force. However, as described later in detail, since the hydraulic damping force correlates closely with road-holding ability of the vehicle, there is a risk that reduction of the hydraulic damping force would lead to reduction of the road-holding ability of the vehicle, particularly, upon occurrence of vibrations of relatively high frequency range. Therefore, in the suspension system constructed according to the present invention, in the low intensity situation in which the intensity of the unsprung-portion resonance frequency vibration is not higher than the threshold intensity value, the hydraulic damping force is reduced so as to make it possible to reduce influence of the hydraulic damping force affecting the sprung-portion vibration damping control. On the other hand, in the high intensity situation in which the intensity of the unsprung-portion resonance frequency vibration is higher than the threshold intensity value, the hydraulic damping force is not so reduced as in the low intensity situation, so that it is possible to restrain reduction of the road-holding ability of the vehicle upon occurrence of vibrations of relatively high frequency range.

(B) Modes of the Invention

There will be described various modes of the invention (hereinafter referred to as "claimable invention" where appropriate) deemed to contain claimable features for which protection is sought. Each of these modes of the invention is numbered like the appended claims and depends from the other mode or modes, where appropriate, for easier understanding of the technical features disclosed in the present specification. It is to be understood that the claimable invention is not limited to the technical features or any combinations thereof which will be described in each of these modes. That is, the scope of the claimable invention should be interpreted in the light of the following descriptions accompanying the various modes and preferred embodiment of the invention. In a limit in accordance with such an interpretation, a mode of the claimable invention can be constituted by not only any one of these modes but also either a mode provided by any one of these modes and additional component or components incorporated therein and a mode provided by any one of these modes without some of components recited therein.

(1) A suspension system for a vehicle, including:

(a) a suspension spring disposed between sprung and unsprung portions of the vehicle;

(b) a hydraulic damper disposed in parallel with the suspension spring, and configured to generate a damping force against displacement of the sprung and unsprung portions relative to each other such that an amount of the damping force is changeable by a damping force changer that is included in the damper;

(c) a displacement force generator disposed in parallel with the suspension spring, and configured to generate, based on a motor force generated by an electromagnetic motor that is included in the displacement force generator, a displacement force causing the sprung and unsprung portions to be displaced toward or away from each other; and (d) a controller including (d-1) a damping-force controlling portion configured to control the damping force changer, so as to control the damping force that is to be generated by the damper, and (d-2) a displacement-force controlling portion configured to control actuation of the electromagnetic motor, so as to control the displacement force that is to be generated by the displacement force generator, wherein the displacement-force controlling portion is configured to execute a sprung-portion vibration damping control for controlling the displacement force that is to be generated by the displacement force generator, such that the generated displacement force acts as a damping force against sprung-portion vibration which occurs in the sprung portion, and wherein the damping-force controlling portion is configured, upon execution of the sprung-portion vibration damping control by the displacement-force controlling portion, to execute a damping force reducing control for reducing the damping force that is to be generated by the damper, depending on unsprung-portion resonance frequency vibration which occurs in the vehicle and which has a resonance frequency of the unsprung portion, such that the damping force generated by the damper is made smaller in a low intensity situation in which an intensity of the unsprung-portion resonance frequency vibration is not higher than a threshold intensity value, than in a high intensity situation in which the intensity is higher than the threshold intensity value.

In the suspension system according to this mode (1), the displacement force generated by the displacement force generator is caused to act as the damping force against the sprung-portion vibration, for thereby executing the sprung-portion vibration damping control. Since the hydraulic damper, which is disposed in parallel with the displacement force generator, is configured to generate the hydraulic damping force acting against displacement of the sprung and unsprung portions relative to each other, the hydraulic damping force could act on the sprung-portion vibration, so that there is a risk that the hydraulic damping force would affect the sprung-portion vibration damping control executed by the displacement force generator. In view of such a risk, it is desirable to minimize the hydraulic damping force upon execution of the sprung-portion vibration damping control. However, where the hydraulic damping force is reduced by taking account of the influence of the hydraulic damping force affecting the sprung-portion vibration, the hydraulic damping force would less affect unsprung-portion vibration (which occurs in the unsprung portion) as well as the sprung-portion vibration, thereby reducing effect of damping the unsprung-portion vibration so that there is a risk that the road-holding ability of the vehicle could be reduced. The road-holding ability would be reduced with reduction of the hydraulic damping force, particularly, upon occurrence of vibrations of relatively high frequency range.

In the system according to this mode (1), with the above-described things being taken into account, upon execution of the sprung-portion vibration damping control, the hydraulic damping force is made smaller in the low intensity situation (in which the intensity of the unsprung-portion resonance frequency vibration is not higher than the threshold intensity value), than in the high intensity situation (in which the intensity is higher than the threshold intensity value). Therefore, in the system according to this mode (1), in the low intensity situation, the hydraulic damping force is reduced so as to make it possible to reduce influence of the hydraulic damping force affecting the sprung-portion vibration damping control. On the other hand, in the high intensity situation, the hydraulic damping force is not so reduced as in the low intensity situation, so that it is possible to restrain reduction of the road-holding ability of the vehicle upon occurrence of vibrations of relatively high frequency range.

The "hydraulic damper" recited in this mode (1) may have a construction that is not particularly limited, and may be of any types such as cylinder type and rotary type. The "damping force changer" included in the damper may be configured to change the amount of the hydraulic damping force (that is to be generated by the damper), for example, by changing a damping coefficient of the damper, as long as it is capable of changing the amount of the hydraulic damping force without depending on relative velocity of the sprung and unsprung portions. That is, the "damping force reducing control" recited in this mode (1) may be a control for reducing the damping coefficient of the damper. Further, the damping force changer may be configured, for example, to selectively establish and release connection or interlocking between the damper and one of the sprung and unsprung portions, so that the amount of the hydraulic damping force can be zeroed, by inhibiting generation of the hydraulic damping force by releasing the interlocking between the damper and the one of the sprung and unsprung portions. That is, in the damping force reducing control, the amount of the hydraulic damping force may be reduced to 0 (zero).

A judgment as to whether the intensity of the unsprung-portion resonance frequency vibration is higher than the threshold intensity value does not necessarily have to be made based on the unsprung-portion resonance frequency vibration as such, but may be made based on vibrations of unsprung-portion resonance frequency range which has a center corresponding to the unsprung-portion resonance frequency and which ranges, for example, from 3 Hz subtracted from the unsprung-portion resonance frequency to 3 Hz added to the unsprung-portion resonance frequency. Where the judgment is made based on the vibrations of unsprung-portion resonance frequency range, the judgment may be made based on an average value of the intensities of the vibrations of unsprung-portion resonance frequency range, or based on a maximum value of the intensities of the vibrations of unsprung-portion resonance frequency range. Described specifically, for example, when the intensity of the unsprung-portion resonance frequency vibration, the average value of the intensities of the vibrations of unsprung-portion resonance frequency range or the maximum value of the intensities of the vibrations of unsprung-portion resonance frequency range is higher than a predetermined value, it is possible to judge that the intensity is higher than the threshold intensity value. Further, the "intensity of the unsprung-portion resonance frequency vibration" recited in this mode (1) may be interpreted to mean, for example, amplitude or acceleration of the unsprung-portion resonance frequency vibration, or amplitudes or accelerations of the vibrations of unsprung-portion resonance frequency range.

The "sprung-portion vibration damping control" recited in this mode (1) may be a control executed based on a so-called skyhook damper theory, i.e., a control for causing the displacement force to act as the damping force whose amount is determined based on absolute velocity of the sprung portion. More specifically, the sprung-portion vibration damping control recited in this mode (1) may be a control executed with a so-called pseudo ground hook damper theory being taken into account, i.e., a control for causing the displacement force to act as the damping force whose amount is determined based on absolute velocities of the sprung and unsprung portions. Further, the "sprung portion" recited in this mode (1) may be broadly interpreted to mean a portion of a vehicle body that is supported by the suspension spring, while the "unsprung portion" recited in this mode (1) may be broadly interpreted to mean a suspension arm or other vehicle component that is vertically movable together with an axle shaft of the vehicle.

(2) The suspension system according to mode (1), wherein the damping force reducing control is executed to reduce the damping force that is to be generated by the damper such that a damping coefficient of the damper is not larger than 500 N·sec/m in the low intensity situation.

The hydraulic damper is, in general, configured to generate the hydraulic damping force by limiting flow of a working fluid within the hydraulic damper, which flow is caused upon displacement of the sprung and unsprung portions relative to each other. Where the damper is provided with a mechanism for changing its damping coefficient, it is common that such a changing mechanism is configured to change a flow passage area so as to change an amount of resistance acting against the flow of the working fluid. That is, the "damping force changer" included in the damper may be a damping-coefficient changing mechanism that is configured to change the flow passage area.

The damping coefficient of a conventional hydraulic damper (i.e., damper that is to be provided in a suspensions system not equipped with the displacement force generator) is, commonly, about 3000-5000 N·sec/m. When the damping coefficient of the damper is not higher than 500 N·sec/m, it is possible to reduce influence of the hydraulic damping force affecting the sprung-portion vibration damping control. It is noted that "500 N·sec/m" recited as a value of the damping coefficient in this mode (2) is a value obtained under an assumption that the hydraulic damping force is arranged to act directly on the vehicle body and wheel that are displaced relative to each other, rather than to act on actuation of the damper that arises from the displacement of the sprung and unsprung portions relative to each other.

(3) The suspension system according to mode (2), wherein the damping force reducing control is executed to reduce the damping force that is to be generated by the damper such that an amount of the generated damping force is substantially zero in the low intensity situation.

In the system according to the present mode (3), the amount of the hydraulic damping force may be reduced to zero by inhibiting generation of the hydraulic damping force, or may be reduced substantially to zero by minimizing the damping coefficient. Specifically described, the generation of the hydraulic damping force can be inhibited by releasing interlocking of the damper with at least one of the sprung and unsprung portions, as described below. Where there is provided a damping force reducing mechanism that is configured to change a flow passage area so as to change an amount of resistance acting against the working fluid in the damper, it is possible to minimize the damping coefficient by maximizing the flow passage area. Further, the damping coefficient can be made small by employing, as the working fluid in the damper, silicon oil or other fluid having a low degree of viscosity.

(4) The suspension system according to mode (3), wherein the damper includes a first interlocked portion that is interlocked with the sprung portion and a second interlocked portion that is interlocked with the unsprung portion, and is configured to generate the damping force against the displacement of the sprung and unsprung portions relative to each other, by generating a resistance force against displacement of the first and second interlocking portions relative to each other, wherein the damping force changer includes an interlock releaser that is configured to release interlocking between the sprung portion and the first interlocking portion and/or interlocking between the unsprung portion and the second interlocking portion, and wherein the damping-force controlling portion is configured, in the damping force reducing control, to cause the interlock releaser to release the interlocking between the sprung portion and the first interlocking portion and/or the interlocking between the unsprung portion and the second interlocking portion.

In the system according to this mode (4), the generation of the hydraulic damping force can be inhibited in the damping force reducing control, so that it is possible to eliminate influence of the hydraulic damping force affecting the sprung-portion vibration damping control in the low intensity situation in which the intensity of the unsprung-portion resonance frequency vibration is not higher than the threshold intensity value. Thus, the sprung-portion vibration can be effectively damped through the sprung-portion vibration damping control that is executed by the displacement-force controlling portion.

(5) The suspension system according to any one of modes (1)-(4), wherein the damping-force controlling portion is configured, upon execution of the sprung-portion vibration damping control, to control the damping force that is to be generated by the damper such that a damping coefficient of the damper is within a range from 1000 to 2000 N·sec/m in the high intensity situation.

The displacement force, which is to be generated by the displacement force generator, is changeable by controlling actuation of the electromagnetic motor. Thus, there is a high possibility that problems such as followability of the actuation of the electromagnetic motor make it difficult to satisfactorily damp vibrations of relatively high frequency range in execution of the sprung-portion vibration damping control. In view of this, it is desirable that the vibrations of high frequency range are damped by the hydraulic damper. The damping coefficient of the hydraulic damper correlates with transmittability of vibrations from the unsprung portion to the sprung portion, and vibrations of relatively high frequency range become more difficult to be transmitted from the unsprung portion to the sprung portion, in general, as the damping coefficient becomes lower. Therefore, in view of the transmittability of vibrations of relatively high frequency range, it is desirable that the damping coefficient of the hydraulic damper is low. However, the damping coefficient of the hydraulic damper correlates closely also with road-holding ability of the vehicle, and the road-holding ability upon occurrence of vibrations of relatively high frequency range tends to be reduced with reduction of the damping coefficient, as described below in detail. Particularly, when the damping coefficient is reduced to a certain degree, the road-holding ability upon occurrence of the vibrations of relatively high frequency range tends to be considerably reduced. The range from 1000 to 2000 N·sec/m, which is recited as a range of the damping coefficient in this mode (5), is a range of the damping coefficient determined by taking account of balance between the transmittability of vibrations of relatively high frequency range and the road-holding ability upon occurrence of vibrations of relatively high frequency range. Therefore, in the system according to this mode (5), even in the high intensity situation in which the intensity of the unsprung-portion resonance frequency vibration is higher than the threshold intensity value, vibrations that are difficult to be followed by the displacement force generator can be restrained from being transmitted to the sprung portion while a satisfactory degree of the road-holding ability can be obtained.

Like "500 N·sec/m" recited as a value of the damping coefficient in the above-described mode (2), "1000-20000 N·sec/m" recited as a range of the damping coefficient in this mode (5) is a range obtained under an assumption that the hydraulic damping force is arranged to act directly on the vehicle body and wheel that are displaced relative to each other, rather than to act on actuation of the damper that arises from the displacement of the sprung and unsprung portions relative to each other.

(6) The suspension system according to any one of modes (1)-(5), wherein the displacement-force controlling portion is configured, in the sprung-portion vibration damping control, to control the displacement force that is to be generated by the displacement force generator such that an amount of at least one component of the generated displacement force is dependent on an absolute velocity of the sprung portion.

In the system according to this mode (6), the sprung-portion vibration damping control is executed in accordance with a rule that makes it possible to cause the displacement force generator to generate the damping force which is based on the motor force generated by the electromagnetic motor and which is not dependent on relative velocity of the sprung and unsprung portions. That is, in this system, it is possible to execute a control for generating the damping force dependent on the absolute velocity of the sprung portion, i.e., a control based on a so-called skyhook damper theory, so that the sprung-portion vibration can be effectively damped.

(7) The suspension system according to any one of modes (1)-(6), wherein the displacement-force controlling portion is configured to execute a posture change restraining control for restraining change of posture of a body of the vehicle, by controlling the displacement force that is to be generated by the displacement force generator such that at least one component of the generated displacement force acts as a roll restraining force for restraining roll of the body of the vehicle and/or a pitch restraining force for restraining pitch of the body of the vehicle.

In the system according to this mode (7), the displacement force is caused to act as a posture-change restraining force for restraining change of posture of the vehicle body, and at least one of a roll restraining control and a pitching restraining control is executed. The "roll restraining force" recited in this mode (7) serves to reduce an amount of roll of the vehicle body that arises from turning of the vehicle so as to restrain the roll of the vehicle body, and may be determined based on, for example, a roll moment arising from the turning of the vehicle. The "pitch restraining force" recited in this mode (7) serves to reduce an amount of pitch of the vehicle body that arises from acceleration and deceleration of the vehicle so as to restrain the pitch of the vehicle body, and may be determined based on, for example, a pitch moment arising from the acceleration and deceleration of the vehicle. It is noted that, where the above-described sprung-portion vibration damping control and posture change restraining control are to be executed concurrently with each other, the displacement force that is to be generated by the displacement force generator is adapted to include a component acting as the posture-change restraining force in addition to a component acting as the damping force against the sprung-portion vibration.

(8) The suspension system according to any one of modes (1)-(7), wherein the displacement force generator includes (c-1) an elastic body connected at one of opposite end portions thereof to one of the sprung and unsprung portions, and (c-2) an electromagnetic actuator which is disposed between the other of the opposite end portions of the elastic body and the other of the sprung and unsprung portions and which interconnects the elastic body and the other of the sprung and unsprung portions, and wherein the electromagnetic actuator includes the electromagnetic motor, and is configured to generate an actuator force based on the motor force generated by the electromagnetic motor, such that the generated actuator force acts on the elastic body so as to change an amount of deformation of the elastic body that is dependent on an amount of actuation of the actuator, and such that the generated actuator force is transmitted to the sprung and unsprung portions via the elastic body so as to act as the displacement force.

In the system according to this mode (8), the displacement force generator has a construction as specified above. The "displacement force generator" described in this mode (8) is configured to cause the actuator force (generated by the actuator) to act on the elastic body so as to change the amount of deformation of the elastic body that is dependent on the amount of actuation of the actuator. The "elastic body" recited in this mode (8) may be provided by any one of various forms of elastic bodies such as coil spring and torsion spring, as long as it is capable of exhibiting an elastic force that is dependent on an amount of its deformation.

(9) The suspension system according to mode (8), wherein the elastic body includes (c-1-i) a shaft portion which is rotatably held by a body of the vehicle and (c-1-ii) an arm portion which extends from one of opposite end portions of the shaft portion in a direction intersecting the shaft portion and which is connected at a distal end portion thereof to a wheel holder holding a wheel of the vehicle, and wherein the actuator is fixed to the body of the vehicle, and is configured to rotate the shaft portion about an axis of the shaft portion by the actuator force generated by the actuator.

In this mode (9), the construction of the displacement force generator is more specified. The "elastic body" described in the present mode includes the shaft portion and the arm portion, at least one of which has a function serving as the elastic body. For example, the shaft portion may be arranged to be twisted so as to serves as a spring, and/or the arm portion may be arranged to be deflected so as to serve as a spring. It is noted that the elastic body may be constituted by either an assembly of the shaft and arm portions provided by respective members that are connected to each other, or a single piece including the shaft and arm portions that are provided by a single member.

(10) The suspension system according to mode (8) or (9), wherein the actuator is configured to have a positive/negative efficiency product that is not larger than ½, where the positive/negative efficiency product is defined as a product of a positive efficiency of the actuator and a negative efficiency of the actuator, the positive efficiency is defined as a ratio of an amount of an external force acting on the actuator, to an amount of the motor force minimally required to cause the actuation of the actuator against the external force, and the negative efficiency is defined as a ratio of an amount of the motor force minimally required to inhibit the actuator from being actuated by an external force acting on the actuator, to an amount of the external force.

The "positive/negative efficiency product" described in the present mode may be considered as a ratio of an amount of the motor force minimally required to inhibit the actuator from being actuated by a certain amount of the external force acting on the actuator, to an amount of the motor force minimally required to cause the actuation of the actuator against the external force. Thus, a low value of the positive/negative efficiency product indicates that the actuator is hard to be actuated by the external force. Where the positive/negative efficiency product of the actuator is relatively low, the electromagnetic motor requires a relatively small amount of electric power for maintaining a wheel-body distance (i.e., a vertical distance between the wheel and the vehicle body) under application of the external force to the actuator, for restraining roll and pitch of the vehicle body. Therefore, the system according to this mode (10) is a suspension system that is advantageous from a point of view of electric power saving.

(11) The suspension system according to any one of modes (8)-(10), wherein the actuator includes a speed reducer configured to decelerate motion that is inputted from the electromagnetic motor, and is configured to output the decelerated motion as the actuation of the actuator, and wherein the speed reducer has a speed ratio that is not higher than 1/100.

In the system according to this mode (11), the speed ratio of the speed reducer of the actuator is relatively low, namely, a ratio of an actuation amount of the actuator to a motion amount of the electromagnetic motor is relatively low. It can be considered that the above-described positive/negative efficiency product is, in general, reduced by employing the speed reducer having a low speed ratio. In view of this, the system of this mode can be considered as a kind of the system in which the actuator having a relatively low positive/negative efficiency product is employed. The employment of the speed reducer having the low speed ratio permits the electromagnetic motor to be made compact in size.

BRIEF DESCRIPTION OF DRAWINGS

The above and other objects, features, advantages and technical and industrial significance of the present invention will be better understood by reading the following detailed description of presently preferred embodiments of the invention, when considered in connection with the accompanying drawings, in which:

FIG. 18 is a block diagram showing various functional portions of a controller for controlling the suspension system of FIG. 14.

BEST MODE FOR CARRYING OUT THE INVENTION

There will be described embodiments of the present invention, by reference to the accompanying drawings. It is to be understood that the present invention is not limited to the following embodiments, and may be otherwise embodied with various changes and modifications, such as those described in the foregoing "MODES OF THE INVENTION", which may occur to those skilled in the art.

(A) First Embodiment

<Construction of Vehicle Suspension System>

Figure 1:
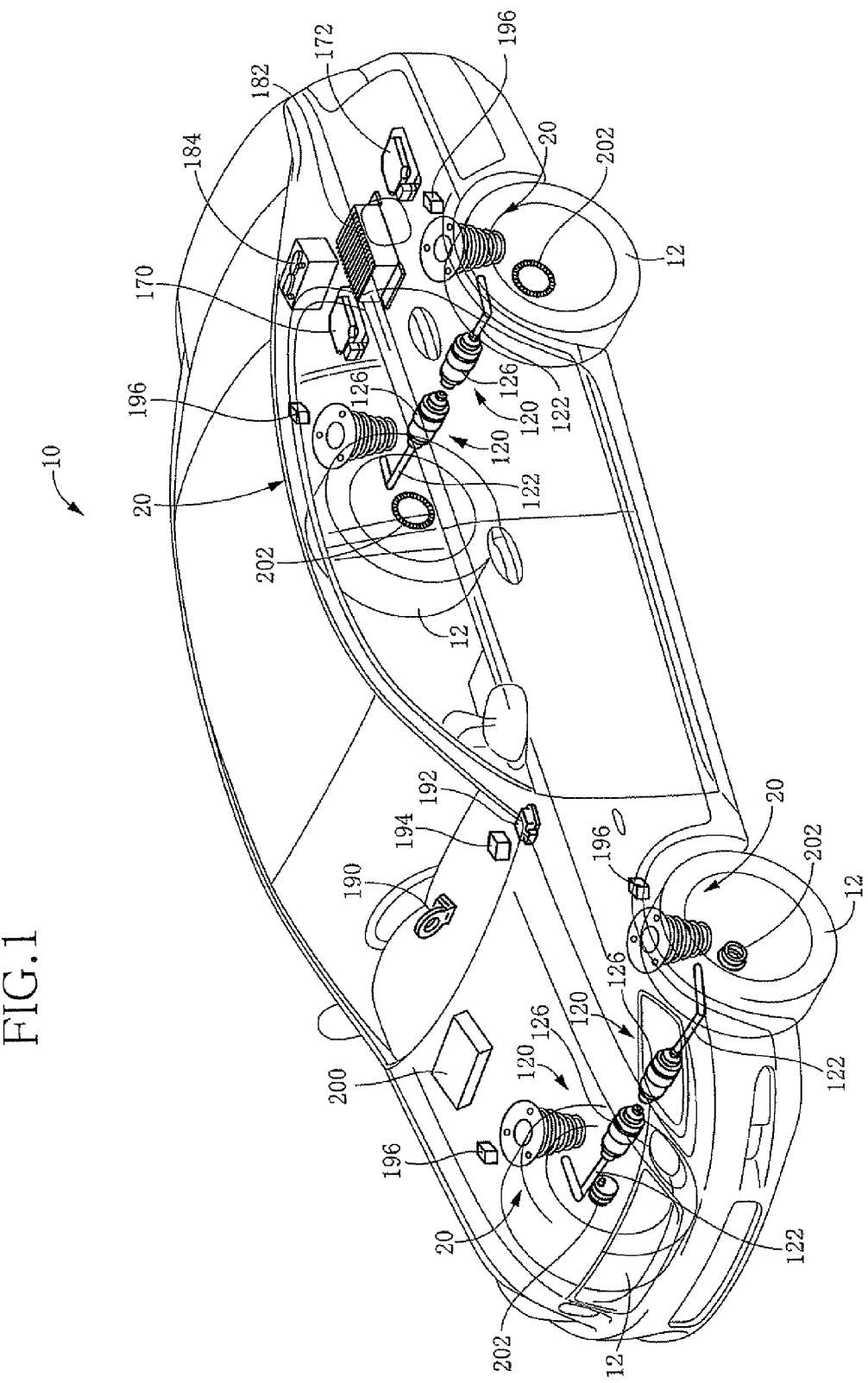
FIG. 1 is a view schematically showing an overall construction of a suspension system for a vehicle, which is constructed according to a first embodiment of the invention.

FIG. 1 schematically shows a vehicle suspension system 10, which includes four suspension devices 20 that are provided for respective four wheels 12 (i.e., front right, front left, rear right and rear left wheels 12) and a controller device configured to control the suspension devices 20. Each of the suspension devices 20 provided for a front wheel 12 as a steered wheel is equipped with a mechanism for allowing the wheel 12 to be steered, while each of the suspension devices 20 provided for a rear wheel 12 as a non-steered wheel is not equipped with such a steering mechanism. However, since all the suspension devices 20 can be regarded to be identical in construction with one another except for presence or absence of the steering mechanism, there will be described, as a representative of the four suspension devices 20, one of the suspension devices 20 that is provided for the rear wheel 12, in the interest of simplification of the description.

Figure 2:
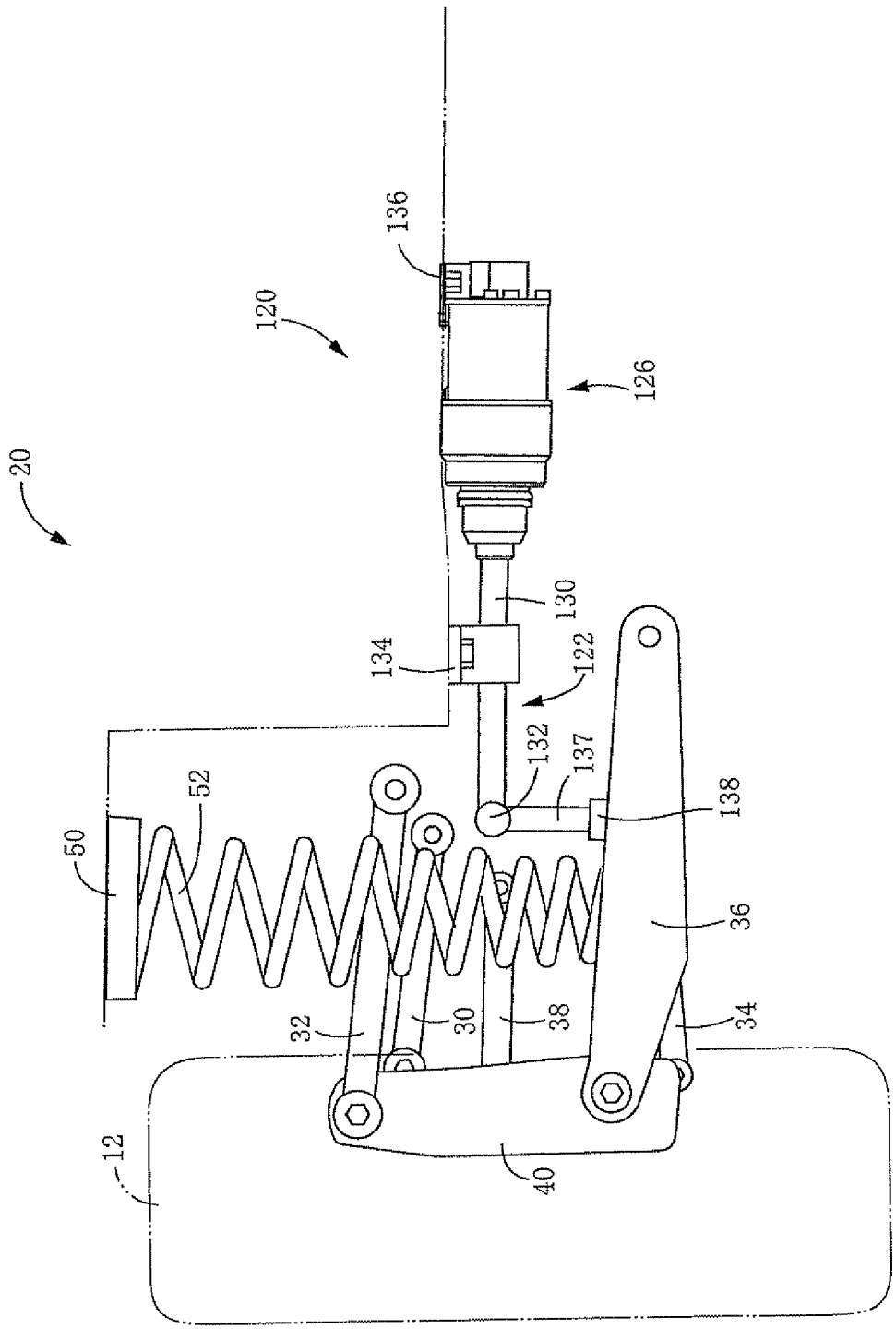
FIG. 2 is a view of a suspension device provided in the suspension system of FIG. 1, as seen from a rear side of the vehicle.
Figure 3:
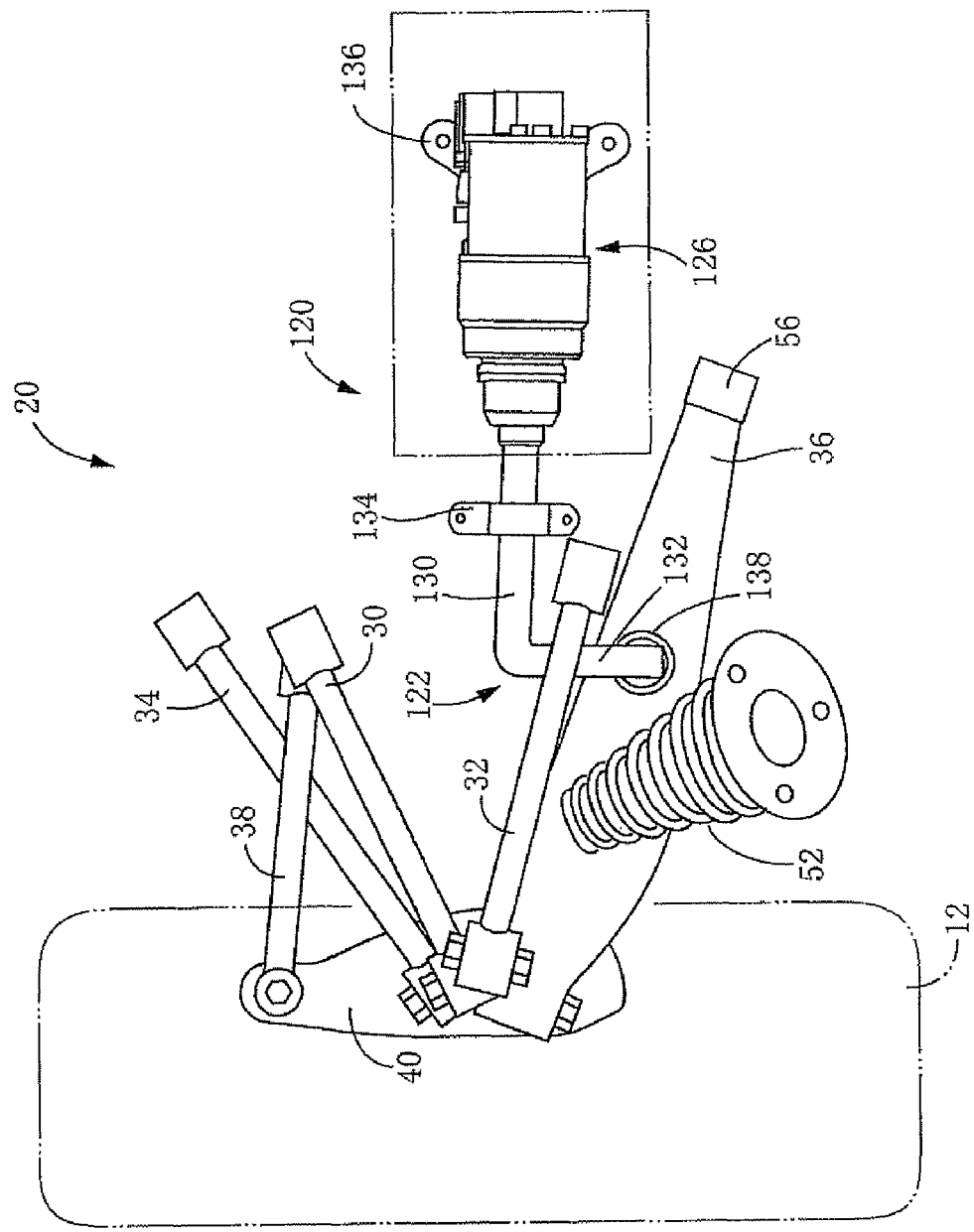
FIG. 3 is a view of the suspension device provided in the suspension system of FIG. 1, as seen from an upper side of the vehicle.

As shown in FIGS. 2 and 3, each suspension device 20 of independent type is provided by a multi-link suspension, and is equipped with an arm assembly as a wheel holder that includes a total of five suspension arms, i.e., a first upper arm 30, a second upper arm 32, a first lower arm 34, a second lower arm 36 and a toe control arm 38. Each of the five suspension arms 30, 32, 34, 36, 38 is connected at one of its longitudinal end portions to a body of the vehicle, pivotably relative to the vehicle body, and is connected at the other longitudinal end portion to an axle carrier 40 by which the wheel 12 is rotatably carried. Owing to its connection with the five suspension arms 30, 32, 34, 36, 38, the axle carrier 40 is vertically displaceable relative to the vehicle body along a substantially constant locus. Each suspension device 20 includes a coil spring 52 as a suspension spring and a hydraulic damper 56 of rotary type, and interconnects the corresponding wheel 12 and the vehicle body. The coil spring 52 is disposed between a mount portion 50 and the above described second lower arm 36. The mount portion 50 is disposed in a tire housing which constitutes a part of a sprung portion of the vehicle, while the second lower arm 46 constitutes a part of an unsprung portion of the vehicle. The damper 56 is provided in one of opposite end portions of the second lower arm 36 that is close to the vehicle body, and the second lower arm 36 is connected via the damper 56 to the vehicle body, pivotably relative to the vehicle.

Figure 4:
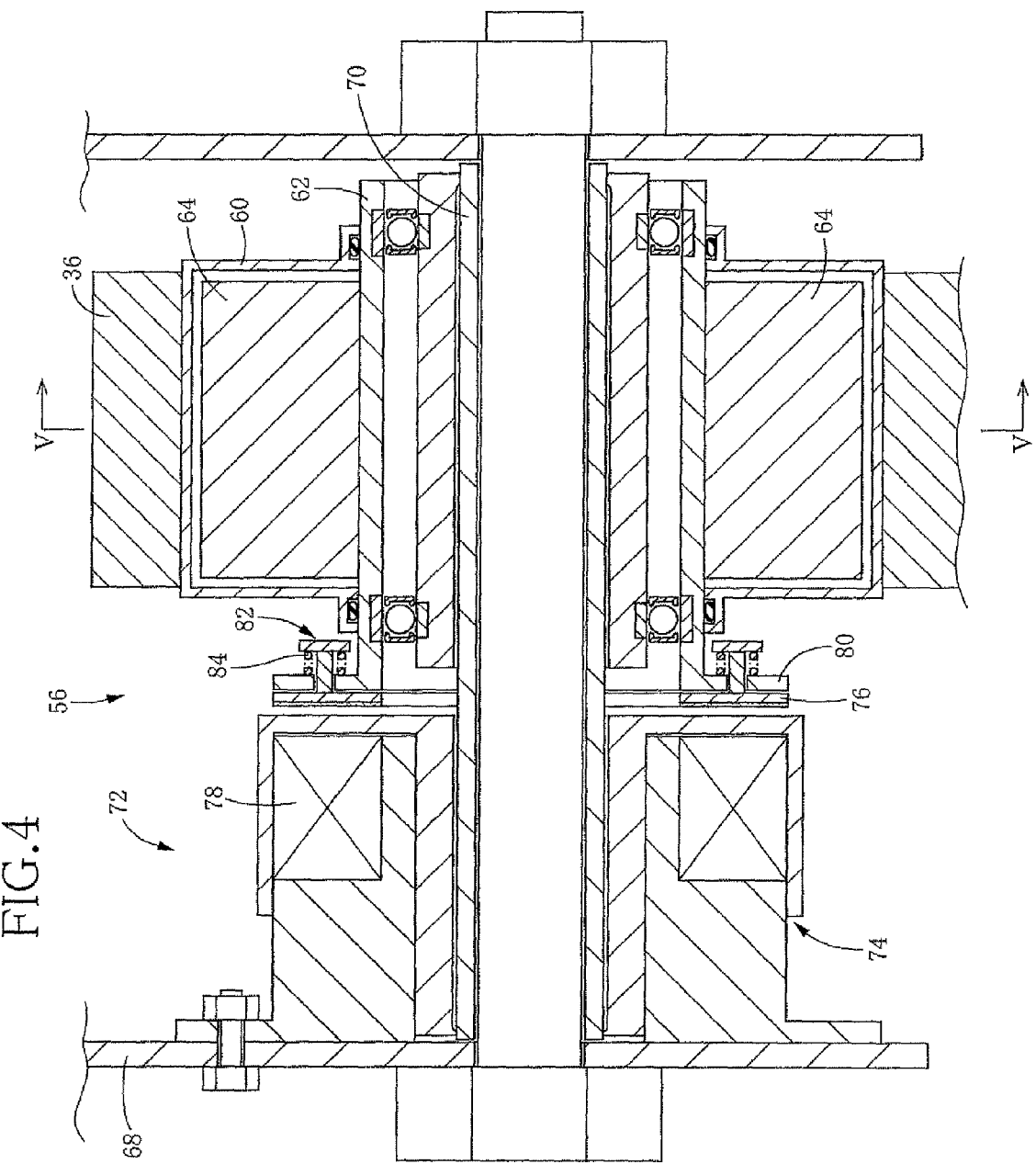
FIG. 4 is a view, partially in cross section, showing a hydraulic damper that is included in the suspension device.
Figure 5:
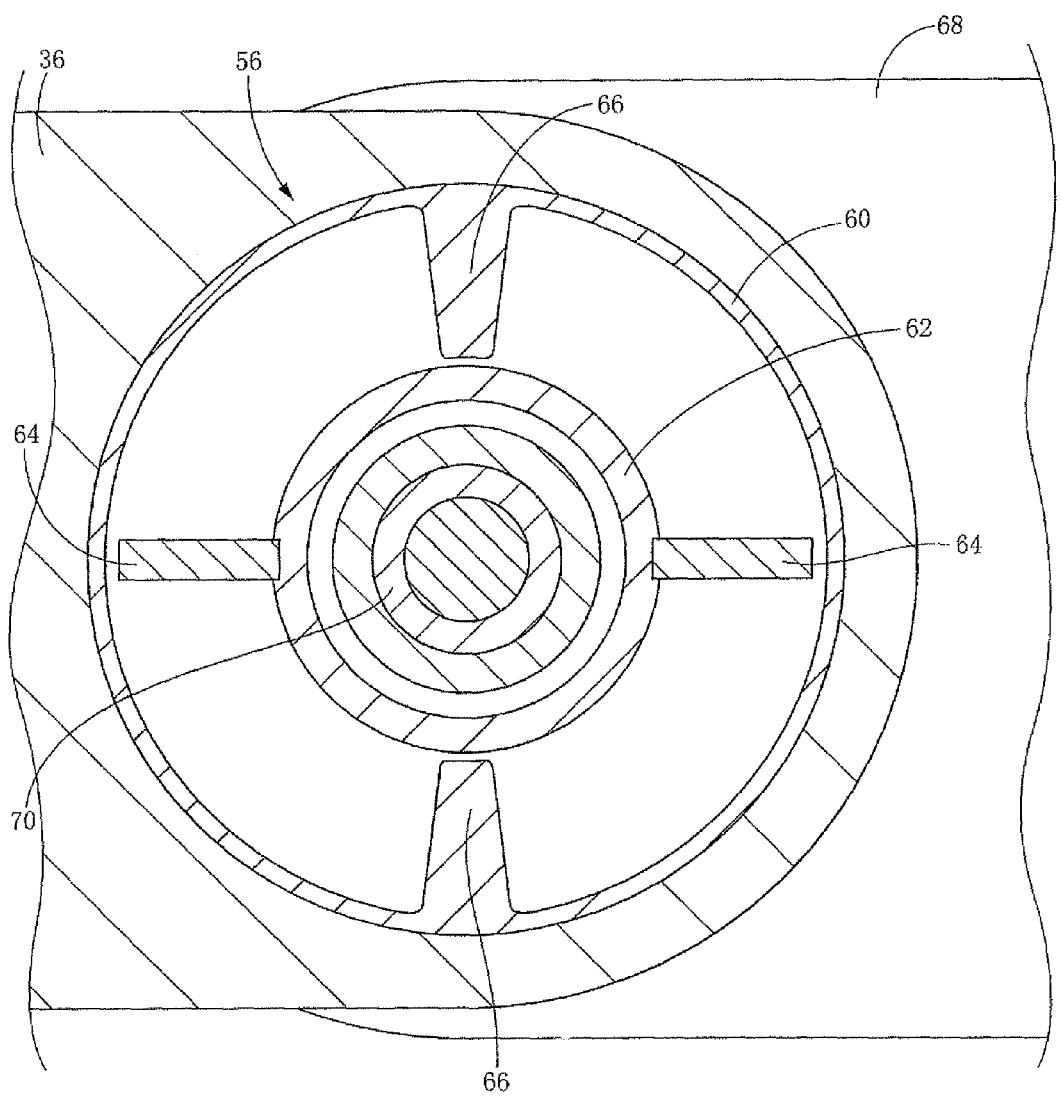
FIG. 5 is a cross sectional view taken along line V-V in FIG. 4.

As shown in FIG. 4 and FIG. 5 that is a cross sectional view taken along line V-V in FIG. 4, the hydraulic damper 56 includes a generally cylindrical-shaped damper housing 60, a hollow-shaped damper shaft 62 and a pair of vanes 64. The damper housing 60 is fixedly fitted in the end portion of the second lower arm 36, and stores a working fluid therein. The damper shaft 62 extends throughout the damper housing 62. The pair of vanes 64 are fixed to an outer circumferential surface of the damper shaft 62, and are symmetrical with respect to an axis of the damper shaft 62. The damper shaft 62 is in slidable contact with the damper housing 60 via annular seal members, and is rotatable about its axis. The pair of vanes 64, which are fixed to the damper shaft 62 within the damper housing 60, is rotatable together with the damper shaft 62 about the axis of the shaft 62. The damper housing 60 has a pair of protruding portions 66 which extend radially inwardly from respective portions of an inner circumferential surface of the damper housing 60 and which are symmetrical with respect to an axis of the damper housing 60, so that an inner space of the damper housing 60 is sectioned, by the pair of protruding portions 66, into a pair of fluid chambers. When the damper shaft 62 is rotated, each of the vanes 64 is rotated within a corresponding one of the fluid chambers.

The vehicle body includes a yoke portion 68 to which the second lower arm 36 is attached through the damper 56. The yoke portion 68 has two mutually opposed walls that are interconnected through a bushing 70, as shown in FIG. 4. The hollow-shaped damper shaft 62 of the damper 56 is rotatably mounted on the bushing 70 via ball bearings, so that the second lower arm 36 is pivotably connected to the vehicle body via the damper 56. The damper 56 further includes an electromagnetic clutch 72 that is also attached to the bushing 70. The clutch 72 includes a casing 74, an annular-shaped engagement member 76 and a coil 78. The casing 74 is fastened to the yoke portion 68, and has a through-hole throughout which the bushing 70 extends. The engagement member 76 is disposed between the casing 74 and a flange portion 80 that is provided in an axial end portion of the damper shaft 62. The coil 78 is disposed in a portion of the casing 74 which is opposed to the engagement member 76. The engagement member 76 is attached to the flange portion 80 of the damper shaft 62 through four attachment pins 82 (only two of which are shown in FIG. 4), such that the engagement member 76 is movable toward and away from the flange portion 80. The four attachment pins 82 are provided in respective four portions of the flange portion 80, which are equi-angularly spaced apart from each other in a circumferential direction of the flange portion 80. Each of the attachment pins 82 has a head portion (large diameter portion) provided by one of its axially opposite end portions that is remote from the engagement member 76, and a compression coil spring 84 is disposed between the flange portion 80 and the head portion of each attachment pin 82. The engagement member 76 is forced toward the flange portion 80 by an elastic force of the coil spring 84 that is compressed between the flange portion 80 and the head portion of each attachment pin 82.

While the electromagnetic clutch 72 is being placed in its deenergized state, the engagement member 76 is spaced apart from the casing 74, as shown in FIG. 4. In this state, when the second lower arm 36 is pivoted relative to the vehicle body, the damper shaft 62 is rotated together with the pivot movement of the second lower arm 36. That is, the damper shaft 62 is not rotated relative to the damper housing 60. On the other hand, while the electromagnetic clutch 72 is placed in its energized state, the engagement member 76 is attracted to the coil 78 so as to be brought into contact at its contact surface with casing 74. In this state, since the contact surface of the engagement member 76 is a surface treated to be capable of generating a large friction force, the damper shaft 62 is fixed relative to casing 74, i.e., relative to the vehicle body, owing to the friction force. When the second lower arm 36 is pivoted relative to the vehicle body with the damper shaft 62 being fixed to the vehicle body, the damper shaft 62 is rotated relative to the damper housing 60 whereby the vanes 64 are rotated within the damper housing 60.

When the vanes 64 are rotated within the damper housing 69 as a result of the pivot movement of the second lower arm 36 during the energized state of the electromagnetic clutch 72, the rotated vanes 64 receive resistance applied from the working fluid that is stored in the damper housing 60. This resistance acts as a damping force against the rotation of the vanes 64, i.e., the pivot movement of the second lower arm 36. The pivot movement of the second lower arm 36 is caused as a result of displacement of the sprung and unsprung portions toward or away from each other. The damper housing 60 is interlocked with the unsprung portion, while the damper shaft 62 and the vanes 64 are interlockable with the sprung portion. That is, the hydraulic damper 56 is configured to generate the damping force acting against the relative displacement of the sprung and unsprung portions, by generating the resistance acting against relative displacement of first and second interlocking portions, wherein the first interlocking portion is provided by the damper shaft 62 and the pair of vanes 64 while the second interlocking portion is provided by the damper housing 60. When the electromagnetic clutch 72 is placed into its deenergized state, the interlocking between the sprung portion and the damper shaft 62 as the first interlocking portion is released. In this sense, the electromagnetic clutch 72 functions as an interlock releaser. When the electromagnetic clutch 72 is placed in its energized state, the hydraulic damper 56 generates the damping force acting against the relative displacement of the sprung and unsprung portions. When the electromagnetic clutch 72 is placed in its deenergized state, the hydraulic damper 56 does not generates the damping force acting against the relative displacement of the sprung and unsprung portions. That is, the clutch 72 functions also as a damping force changer configured to change an amount of the damping force.

Each of the suspension devices 20 includes a wheel-body distance adjuster device 120 that is capable of adjusting a vertical distance between the vehicle body and a corresponding one of the wheels 12 of the vehicle. The adjuster device 120 includes an elastic member in the form of a L-shaped bar 122 having a generally L shape as seen in its plan view and a drive source in the form of an actuator 126 configured to rotate the L-shaped bar 122. As shown in FIGS. 2 and 3, the L-shape bar 122 includes a shaft portion 130 which extends substantially in a width or lateral direction of the vehicle, and an arm portion 132 which is contiguous to the shaft portion 130 and which extends in a direction not parallel to the shaft portion 130, e.g., substantially in a rearward direction of the vehicle. The shaft portion 130 of the L-shaped bar 122 is rotatably held, at its portion that is close to the arm portion 132, by a retainer 134 that is fixed to the vehicle body. The actuator 126 is fixed through an attachment 136 (that is provided in an end portion of the actuator 126) to a widthwise central portion of the vehicle body. The shaft portion 130 is connected at one of its longitudinal end portions (that is located on an inner side of the other of the longitudinal end portions in the width direction of the vehicle) to the actuator 126. Meanwhile, the arm portion 132 is connected at one of its longitudinal end portions (that is remote from the shaft portion 130) to the second lower arm 36 via a link rod 137. A link-rod connection portion 138 is provided on the second lower arm 46 of the suspension device 30, so that the link rod 137 is rockably connected at its longitudinally opposite end portions to the link-rod connection portion 138 and the arm, portion 132 of the L-shaped bar 122, respectively.

Figure 6:
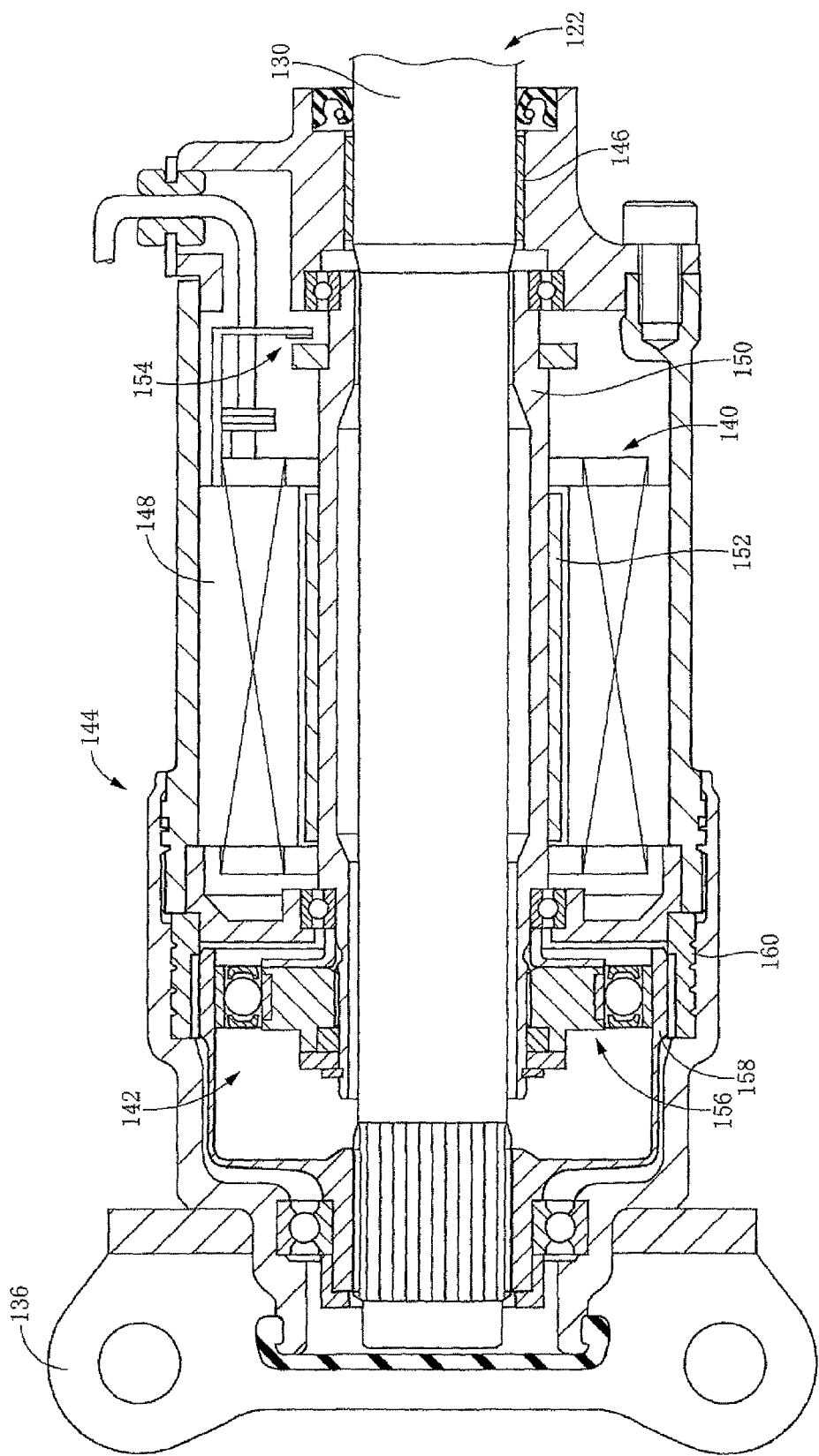
FIG. 6 is a view, partially in cross section, showing an actuator as a component of a wheel-body distance adjuster device that is included in the suspension device.

As shown in FIG. 6, the actuator 126 of the adjuster device 120 includes an electromagnetic motor 140 as a drive source, and a speed reducer 142 arranged to transmit a rotational motion that is inputted from the motor 140 while reducing speed of the rotational motion. The motor 140 and the speed reducer 142 are disposed within a housing 144 as an outer shell member of the actuator 126. The housing 144 is fixedly attached to the vehicle body through the above-described attachment member 136 that is fixed to an end portion of the housing 144. The L-shaped bar 122 is arranged to extend throughout the housing 144 and project out from another end portion of the housing 144. The L-shaped bar 122 is connected, at its portion that is located within the housing 144, to the speed reducer 142. A bearing bushing 146 is provided to support an axially intermediate portion of the shaft portion 130 of the L-shaped bar 122, so that the shaft portion 130 is rotatably held by the housing 144 through the bearing bushing 146.

As shown in FIG. 6, the motor 140 includes a plurality of coils 148 that are fixedly disposed on a circumference along an inner surface of a circumferential wall of the housing 144, a motor shaft 150 that is provided by a hollow member rotatably held by the housing 144, and a permanent magnet 152 which is fixed to an outer circumferential surface of the motor shaft 150 and which is radially opposed to the coils 148. The motor 140 is provided by a three-phase DC brushless motor, so that each of the coils 148 serves as a stator while the permanent magnet 152 serves as a rotor. A motor rotational angle sensor 154 is provided in the housing 144, so as to detect a rotational angle (angular position) of the motor shaft 150, i.e., a rotational angle (angular position) of the motor 140. The rotational angle sensor 154 is constituted principally by a rotary encoder, and outputs a signal that is used in controlling the actuator 126, namely, controlling the adjuster device 120.

The speed reducer 142 is provided by a harmonic gear set (which is also called "harmonic drive (trademark)" or "strain wave gearing"), and includes a wave generator 156, a flexible gear (flexspline) 158 and a ring gear (circular spline) 160. The wave generator 156 includes an elliptic cam and a ball bearing fitted on an outer circumferential surface of the elliptic cam, and is fixed to an end portion of the motor shaft 150. The flexible gear 158 is provided by a cup-shaped member having a circumferential wall portion that is elastically deformable, and a plurality of teeth (e.g., a total of 400 teeth in the present embodiment) formed on its outer circumferential surface. The teeth are located in one of axially opposite end portions of the flexible gear 158 that is close to an opening end of the cup-shaped flexible gear 158. The flexible gear 158 is connected to a gear connection portion of the shaft portion 130 of the L-shaped bar 122, so as to be held by the shaft portion 130. Described more specifically, the shaft portion 130 of the L-shaped bar 122 is arranged to extend throughout the motor shaft 150 provided by the hollow member. The above-described gear connection portion of the shaft portion 130 projects out from the motor shaft 150, and extends through a hole formed through a bottom wall of the cup-shaped flexible gear 158. The gear connection portion of the shaft portion 130 is serrated on its outer circumferential surface so as to be held in engagement with an inner circumferential surface of the hole formed through the bottom wall of the cup-shaped flexible gear 158 that is also serrated. Owing to the serration engagement (spline engagement), the shaft portion 130 and the flexible gear 158 are connected to each other, and are unrotatable relative to each other. The ring gear 160 is provided by a ring member fixed to the housing 144, and has a plurality of teeth (e.g., a total of 402 teeth in the present embodiment) formed on its inner circumferential surface. The flexible gear 158 is fitted at its circumferential wall portion on the wave generator 156, and is elastically deformed to have an elliptic shape. The flexible gear 158 meshes, at two portions thereof that lie substantially on a long axis of the elliptic shape, with the ring gear 160, while not meshing at the other portions thereof with the ring gear 160.

In the speed reducer 142 constructed as described above, while the wave generator 156 is rotated by one rotation (by 360°, namely, while the motor shaft 150 of the electromagnetic motor 140 is rotated by one rotation, the flexible gear 158 and the ring gear 160 are rotated relative to each other by an amount corresponding to two teeth, i.e., a difference therebetween with respect to the number of teeth, so that the speed reducer 142 has a speed ratio of 1/200. This speed ratio of 1/200 is a relatively low speed ratio, and means that a rotational speed of the actuator 126 relative to a rotational speed of the motor 140 is relative low. Owing to the low speed ratio, the motor 140 of the actuator 126 can be made compact in size. Further, owing to the low speed reduction ratio, the actuator 126 is made hard to be actuated by, for example, an external force applied thereto.

When the electromagnetic motor 140 is driven, the L-shaped bar 122 is rotated by a motor force that is generated by the motor 140, whereby the shaft portion 130 of the L-shaped bar 122 is twisted. As a result of the twisting deformation or torsion of the shaft portion 130, a reaction force is generated and then transmitted to the second lower arm 36 via the arm portion 132, link rod 137 and link-rod connection portion 138. This reaction force acts as a displacement force forcing upwardly or downwardly a distal end portion of the second lower arm 36 toward or away from the vehicle body, namely, forcing the corresponding wheel 12 and the vehicle body toward each other or away from each other. That is, an actuator force, which is a force generated by the actuator 126, acts as the displacement force through the L-shaped bar 122 serving as an elastic body. In this respect, the adjuster device 120 can be considered to have a function serving as a displacement force generator that is configured to generate the displacement force. By adjusting an amount of the displacement force, it is possible to adjust a vertical distance between the vehicle body and the wheel, i.e., a distance between the sprung and unsprung portions.

Figure 7:
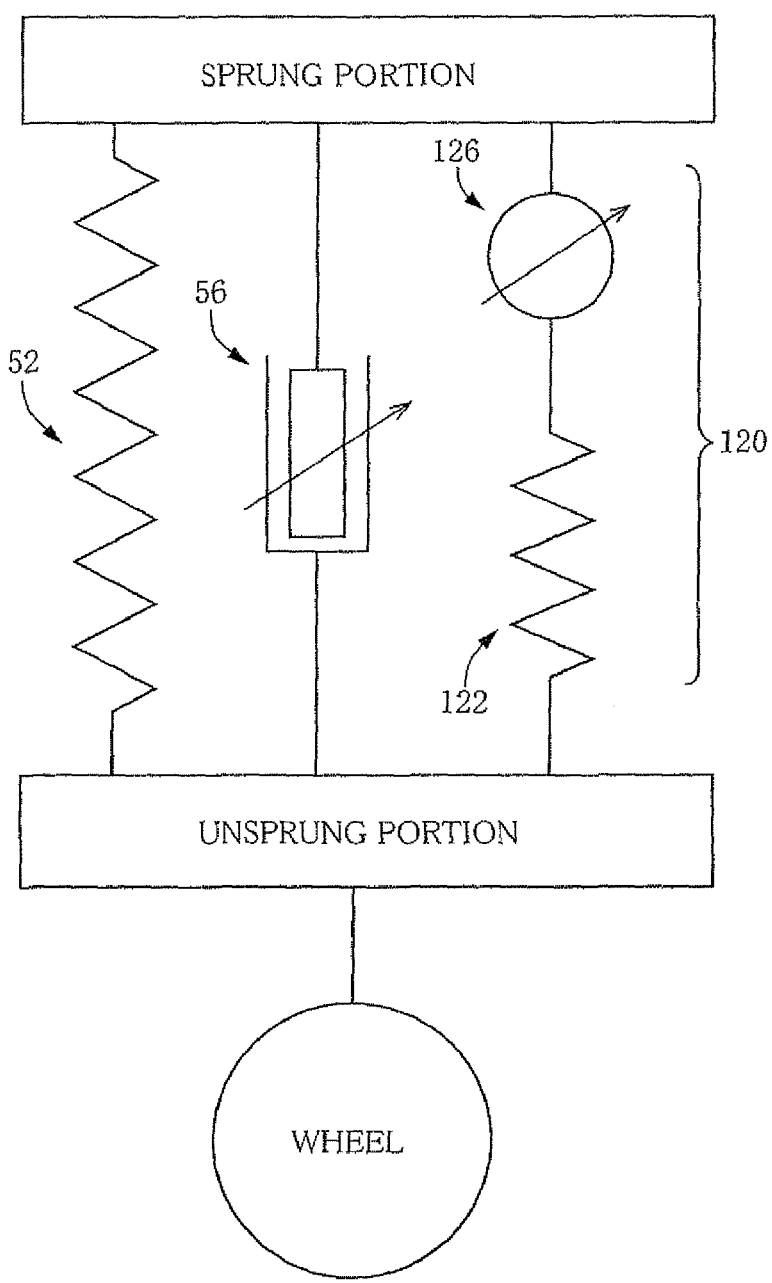
FIG. 7 is a view conceptually showing the suspension device.

Each suspension device 20 has a construction that is conceptually illustrated in FIG. 7. As is understood from FIG. 7, the coil spring 52, hydraulic damper 56 and adjuster device 120 are disposed in parallel with one another between a part of the vehicle body as the sprung portion including the mount portion 50 and the unsprung portion including the second lower arm 36. The adjuster device 120 is constituted by the L-shaped bar 122 (serving as the elastic body) and the actuator 126 that are disposed in series with each other between the sprung and unsprung portions. In other words, the L-shaped bar 122 is disposed in parallel with the coil spring 52 and the damper 56, and the actuator 126 is disposed between the L-shaped bar 122 and the mount portion 50 (as the part of the vehicle body) so as to interconnect the L-shaped bar 122 and the mount portion 50.

The adjuster device 120 is configured to generate the displacement force causing the sprung and unsprung portions to be displaced toward or away from each other, and is capable of changing an amount of the displacement force. Described specifically, the actuator 126 causes the L-shaped bar 122 as the elastic body to be deformed by the actuator force based on the motor force, namely, causes the shaft portion 130 of the L-shaped bar 122 to be twisted by the actuator force, so that the actuator force serves as the displacement force that is applied to the sprung and unsprung portions of the vehicle via the L-shaped bar 122. The amount of deformation of the L-shaped bar 122, i.e., the amount of twisting deformation of the shaft portion 130 corresponds to the amount of actuation of the actuator 126 and also the amount of the actuator force. Since the displacement force is based on an elastic force generated by the deformation of the L-shaped bar 122, the amount of the displacement force corresponds to the amount of actuation of the actuator 126 and the amount of the actuator force. Therefore, the amount of the displacement force can be changed by changing at least one of the amount of actuation of the actuator 126 and the amount of the actuator force. In the present suspension system 10, the displacement force is controlled by controlling directly the amount of actuation of the actuator 126.

It is noted that, in the controls executed in the present suspension system 10, the actuation amount of the actuator 126 is treated as an amount from a reference operating position of the actuator 126. The reference operating position corresponds to an operating position of the actuator 126 in which no actuator force is generated by the actuator 126 in a reference state in which it is regarded that an external force such as roll moment and pitch moment does not substantially act on the vehicle body without vibration being caused in the vehicle body and the wheel 12. Further, since the actuation amount of the actuator 126 and the rotational angle of the electromagnetic motor 140 correspond to each other, the rotational angle of the motor 140 (that is detected by the rotation angle sensor 154), in place of the actuation amount of the actuator 126, is subjected to the controls in the present embodiment.

In the present suspension system 10, as shown in FIG. 1, an adjuster electronic control unit (adjuster ECU) 170 is provided for controlling the four adjuster devices 120, and a damper electronic control unit (damper ECU) 172 is provided for controlling the four dampers 56. Thus, the controller of the present suspension system 10 is constructed to include the two ECUs 170, 172.

The adjuster ECU 170 is configured to control actuations of the actuators 126 of the respective adjuster devices 120, and includes four inverters 174 serving as drive circuits for the electromagnetic motors 140 of the respective actuators 126 and an adjuster controller 176 that is constituted principally by a computer including CPU, ROM and RAM. Meanwhile, the damper ECU 172 is configured to control operations of the electromagnetic clutches 72 of the respective dampers 56, and includes four drivers 178 serving as drive circuits and a damper controller 180 that is constituted principally by a computer including CPU, ROM and RAM (see FIG. 13). The inverters 174 and the drivers 178 are connected to a battery 184 via a converter 182. The inverters 174 are connected to the motors 140 of the respective adjuster devices 120. The drivers 178 are connected to the electromagnetic clutches 72 of the respective dampers 56.

Each of the electromagnetic motors 140 included in the actuators 126 of the respective adjuster devices 120 is driven by a constant voltage, and an amount of the electric power supplied to each motor 140 is changed by changing an amount of electric current supplied to each motor 140. The amount of the supplied electric current is changed by changing a ratio (i.e., duty ratio) of pulse ON time to a sum of the pulse ON time and pulse OFF time in PWM (pulse width modulation) control that is performed by the corresponding inverter 174.

To the adjuster controller 176, there are connected a steering sensor 190, a lateral acceleration sensor 192, a longitudinal acceleration sensor 194 and vertical acceleration sensors 196, in addition to the above-described rotational angle sensors 154. The steering sensor 190 is arranged to detect an operating angle of a steering wheel as a steering operating member, i.e., an operating amount (as a kind of a steering amount) of the steering wheel. The lateral acceleration sensor 192 is arranged to detect an actual acceleration of the vehicle body as measured in the lateral direction of the vehicle. The longitudinal acceleration sensor 194 is arranged to detect the actual acceleration of the vehicle body as measured in the longitudinal direction of the vehicle. Each vertical acceleration sensor 196 is provided in the corresponding mount portion 50 of the vehicle body, and is arranged to detect a sprung-portion vertical acceleration, i.e., the actual acceleration of the vehicle body as measured in the vertical direction of the vehicle. To the adjuster controller 176, there is further connected a brake electronic control unit (brake ECU) 200 which is provided for controlling a brake system of the vehicle. To the brake ECU 200, there are connected four wheel speed sensors 202 each of which is provided to detect a rotational speed of a corresponding one of the four wheels, so that the brake ECU 200 has a function of estimating a running speed (hereinafter referred to as "vehicle speed" where appropriate) of the vehicle based on the values detected by the wheel speed sensors 202. The adjuster controller 176 is configured to obtain the vehicle speed from the brake ECU 200, as needed. Further, the adjuster controller 176 is connected to the inverters 174, so as to control the adjuster devices 120 by controlling the inverters 174. It is noted that the ROM included in the computer of the adjuster controller 176 stores therein programs and various data used for controlling the adjuster device 120.

To the damper controller 180, the above-described vertical acceleration sensors 196 are connected. Further, the damper controller 180 is connected to the drivers 178, so as to control operations of the respective electromagnetic clutches 72 by controlling the drivers 178. It is noted that the ROM included in the computer of the damper controller 180 stores therein programs and various data used for controlling the dampers 56.

<Positive/Negative Efficiencies of Actuator of Adjuster Device>

There will be described an efficiency of the actuator 126 included in the adjuster device 120, which is categorized into a positive efficiency and a negative efficiency. The actuator negative efficiency $\eta_N$ corresponds to a parameter indicative of an amount of the motor force minimally required to inhibit the rotation of the electromagnetic motor 140 that could be caused by an external force acting on the motor 140. More precisely, the negative efficiency $\eta_N$ is defined as a ratio of the amount of the motor force minimally required to inhibit the rotation of the motor 140 caused by the external force, to an amount of the external force. On the other hand, the actuator positive efficiency $\eta_P$ corresponds to a parameter indicative of the amount of the motor force minimally required to cause the shaft portion 122 of the L-shaped bar 122 to be rotated against the external force. More precisely, the positive efficiency $\eta_P$ is defined as a ratio of an amount of the external force, to the amount of the motor force minimally required to cause the rotation of the shaft portion 122. The positive efficiency $\eta_P$ and the negative efficiency $\eta_N$ can be expressed by respective expressions as follows:

Positive efficiency $\eta_P = Fa_P/Fm_P$

Negative efficiency $\eta_N = Fm_N/Fa_N$, where "Fa" represents the actuator force (that may be considered as actuator torque), and "Fm" represents the motor force (that may be considered as motor torque) generated by the motor 140.

Figure 8:
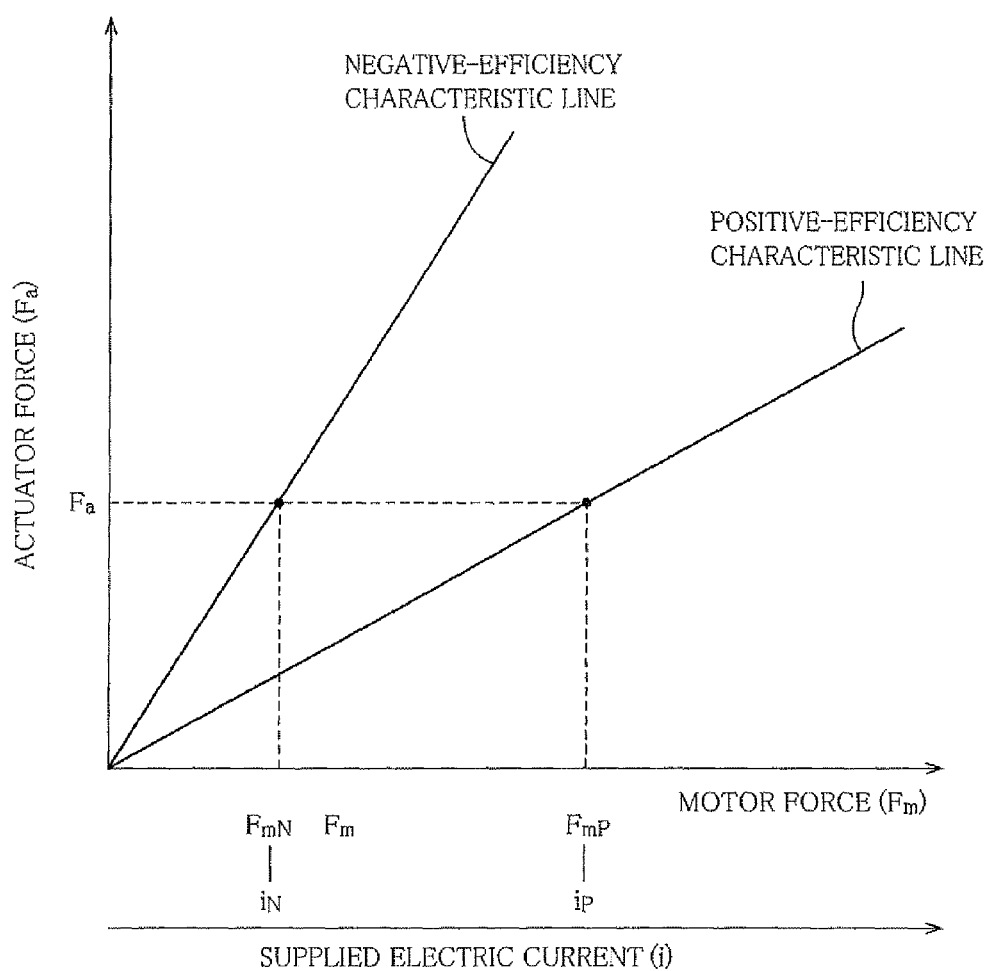
FIG. 8 is a graph showing a positive efficiency and a negative efficiency of the actuator of FIG. 6.

FIG. 8 is a graph representing a relationship between the motor force and the actuator force. The positive efficiency $\eta_P$ corresponds to an inclination of a positive-efficiency characteristic line that is shown in FIG. 8, while the negative efficiency $\eta_N$ corresponds to an inverse of an inclination of a negative-efficiency characteristic line that is also shown in FIG. 8. As is understood from FIG. 8, for producing the same amount of the actuator force Fa, the motor force amount $Fm_P$ of the motor 140 required under the positive efficiency characteristic is considerably different from the motor force amount $Fm_N$ of the motor 140 required under the negative efficiency characteristic ($Fm_P > Fm_N$).

A positive/negative efficiency product $\eta_P \cdot \eta_N$, which is defined as a product of the positive efficiency $\eta_P$ and the negative efficiency $\eta_N$, can be considered as a ratio of an amount of the motor force minimally required to inhibit an actuation of the actuator caused by a certain amount of the external force, to an amount of the motor force minimally required to cause the actuation of the actuator against the certain amount of the external force. Therefore, a low value of the positive/negative efficiency product $\eta_P \cdot \eta_N$ indicates that a low ratio of the motor force amount $Fm_N$ required under the negative efficiency characteristic to the motor force amount $Fm_P$ of the motor 140 required under the positive efficiency characteristic. That is, a low value of the positive/negative efficiency product indicates that the actuator is hard to be actuated by the external force.

As is understood from FIG. 8, the positive/negative efficiency product $\eta_P \cdot \eta_N$ is relative low, specifically, ⅓ in the present actuator 126, so that the actuator 126 is relatively hard to be actuated by the external force. Owing to the relatively low value of the positive/negative efficiency product $\eta_P \cdot \eta_N$, the required amount of the motor force can be made smaller when an operating position of the actuator 126 is to be maintained under application of the external force thereto, than when the actuator 126 is to be actuated against the external force. Since it can be considered that the motor force is proportional to an electric power supplied to the motor, it is possible to remarkably reduce consumption of the electric power in the present actuator 26 in which the positive/negative efficiency product $\eta_P \cdot \eta_N$ is relatively low.

Specifically described, for example, when roll of the vehicle body is to be restrained, upon turning of the vehicle, by controlling the actuator 126, the actuator 126 is actuated against a roll moment arising from the turning of the vehicle in an initial stage of the turning, and the operating position of the actuator 126 is maintained under application of the roll moment in an intermediate stage of the turning. Thus, in the present actuator 126, it is possible to reduce an amount of the electric power consumed by the electromagnetic motor 140 when the roll is to be restrained. When pitch of the vehicle body is to be restrained, upon acceleration or deceleration of the vehicle, too, the operating position of the actuator 126 is maintained under application of a pitch moment arising from the acceleration or deceleration of the vehicle in a certain stage of the acceleration or deceleration. Thus, in the present actuator 126, it is possible to reduce the amount of the electric power consumed by the electromagnetic motor 140 also when the pitch is to be restrained.

<Controls of Suspension System for Vehicle>
(i) Controls of Adjuster Device

In the present suspension system 10, the displacement forces generated by the respective adjuster devices 120 are controllable independently of each other, thereby making it possible to execute a vibration damping control for damping vibration of each of the sprung portions which correspond to the respective adjuster devices 120, a roll restraining control for restraining roll of the vehicle body, and a pitch restraining control for restraining pitch of the vehicle body. In the present system 10, normally, a total control integrating these three controls is executed. During execution of this total control, in each adjuster device 120, the rotational angle of the electromagnetic motor 140 is controlled based on, for example, a motion velocity of the sprung member and roll and pitch moments received by the vehicle body, such that a suitable amount of displacement force is generated by the adjuster device 120. Described in detail, a target rotational angle of the motor 140 is determined based on the motion velocity of the sprung member and the roll and pitch moments received by the vehicle body, and the motor 140 is controlled such that an actual rotational angle of the motor 140 is equalized to the target rotational angle. It is noted that each of the vibration damping control, roll restraining control and pitch restraining control can be considered as a kind of posture change restraining control since these controls are executed for restraining change of posture of the vehicle body.

In the present system 10, the target rotational angle of the electromagnetic motor 140 is determined as a sum of a plurality of components of the target rotational angle which are respectively directed to the vibration damping control, roll restraining control and pitch restraining control. The plurality of components of the target rotational angle of the motor 140 include:

a vibration damping target rotational angle component (vibration damping component) $\theta^*_U$;

a roll restraining target rotational angle component (roll restraining component) $\theta^*_R$; and a pitch restraining target rotational angle component (pitch restraining component) $\theta^*_P$.

In the following description relating to the vibration damping control, roll restraining control and pitch restraining control, there will be described processes of determining the above-described components $\theta^*_U$, $\theta^*_R$, $\theta^*_P$ of the target rotational angle of the motor 140 and also a process of determining an amount of electric power that is to be supplied to the motor 140 based on the target rotational angle of the motor 140.

(a) Sprung-Portion Vibration Damping Control

In execution of the sprung-portion vibration damping control, the displacement force is generated as a damping force whose amount corresponds to a vertical velocity of the vehicle body, i.e., an absolute velocity of the sprung portion of the vehicle, so that the vibration damping control is executed based on a so-called "skyhook damper theory". Specifically described, for generating the displacement force whose amount corresponds to the sprung-portion absolute velocity Vu, the sprung-portion absolute velocity Vu is calculated based on a vertical acceleration Gu of the sprung portion that is detected by the vertical acceleration sensor 196 (provided in the mount portion 50 of the vehicle body), and then the vibration damping component $\theta^*_U$ is determined according to the following expression:

$$\theta^*_U K_1 \cdot C_S \cdot Vu.$$

In the above expression, "$K_1$" is a gain for converting a damping force against the sprung portion vibration, into the vibration damping component $\theta^*_U$, and "$C_S$" is a damping coefficient based on the skyhook damper theory.

(b) Roll Restraining Control

In the roll restraining control executed upon turning of the vehicle, each of the adjuster devices 120 provided for inside wheels (having a smaller turning radius) is controlled to cause the displacement force to act in a bound direction, while each of the adjuster devices 120 provided for outside wheels (having a larger turning radius) is controlled to cause the displacement force to act in a rebound direction, in response to a roll moment arising from the turning of the vehicle. Specifically described, a parameter value Gy* of the lateral acceleration (which is used as a parameter in the control) is determined, on the basis of an estimated value Gyc of the lateral acceleration estimated based on an operating angle δ of the steering wheel and a running speed v of the vehicle and also a measured value Gyr of the lateral acceleration, and according to the following expression:

$$Gy^* = K_2 \cdot Gyc + K_3 \cdot Gyr \ (K_2, K_3: \text{gains})$$

The roll restraining component $\theta^*_R$ is determined based on the lateral acceleration parameter value Gy* that is determined as described above. The adjuster controller 176 of the adjuster ECU 170 stores a data map indicative of relationship between the roll restraining component $\theta^*_R$ and the lateral acceleration parameter value Gy*, so that the roll restraining component $\theta^*_R$ can be determined with reference to the data map.

(c) Pitch Restraining Control

The pitch restraining control is executed, for example, upon braking (deceleration) of the vehicle and upon acceleration of the vehicle. In execution of the pitch restraining control upon the braking of the vehicle, a front-end dive of the vehicle body is restrained, by controlling each of the adjuster devices 120 provided for the front wheels to cause the displacement force to act in the rebound direction, while controlling each of the adjuster devices 120 provided for the rear wheels to cause the displacement force to act in the bound direction, in response to a pitch moment which arises from the braking (deceleration) of the vehicle and which causes the front-end dive of the vehicle body. In execution of the pitch restraining control upon the acceleration of the vehicle, a rear-end squat of the vehicle body is restrained, by controlling each of the adjuster devices 120 provided for the rear wheels to cause the displacement force to act in the rebound direction, while controlling each of the adjuster devices 120 provided for the front wheels to cause the displacement force to act in the bound direction, in response to a pitch moment which arises from the acceleration of the vehicle and which causes the rear-end squat of the vehicle body. Thus, in execution of the pitch restraining control, the front-end dive and the rear-end squat of the vehicle body are restrained by controlling the displacement forces generated by the respective adjuster devices 120. The pitch restraining component $\theta^*_P$ is determined based on the longitudinal acceleration serving as an index of the pitch moment received by the vehicle body. Described in detail, the pitch restraining component $\theta^*_P$ is determined on the basis of a longitudinal acceleration actual value Gzg that is actually measured, and according to the following expression:

$$\theta^*_P = K_4 \cdot Gzg \ (K_4: \text{gain})$$

(d) Determination of Target Electric Current Amount

The target rotational angle $\theta^*$ of the electromagnetic motor 140 is determined based on the determined vibration damping component $\theta^*_U$, roll restraining component $\theta^*_R$ and pitch restraining component $\theta^*_P$ and according to the following expression:

$$\theta^* = \theta^*_U + \theta^*_R + \theta^*_P$$

In execution of the total control, the motor 140 is controlled such that the actual rotational angle θ of the motor 140 is equalized to the target rotational angle $\theta^*$. An amount of the electric power supplied to the motor 140 is determined based on a deviation $\Delta\theta (=\theta^* - \theta)$ of the actual rotational angle θ from the target rotational angle $\theta^*$. In other words, the amount of the electric power supplied to the motor 140 is determined based on the rotational angle deviation $\Delta\theta$ and according to a feedback controlling method. Described specifically, the rotational angle deviation $\Delta\theta$ is obtained based on the actual rotational angle that is detected by the rotational angle sensor 154 of the motor 140, and then a target electric current amount i* is determined based on the rotational angle deviation $\Delta\theta$ and according to the following expression:

$$i^* = K_P \cdot \Delta\theta + K_I \text{Int}(\Delta\theta)$$

A right side of the above expression, which is according to PI control rule, consists of a first term and a second term that are a proportional term and an integral term, respectively. "$K_P$", "$K_I$" represent proportional and integral gains, respectively. "Int ($\Delta\theta$)" represents an integral value of the rotational angle deviation $\Delta\theta$. It is noted that a sign (indicative of positive or negative) of the rotational angle deviation $\Delta\theta$ represents a direction in which the motor 140 is to be rotated for equalizing the actual rotational angle θ to the target rotational angle $\theta^*$, and that an absolute value of the rotational angle deviation $\Delta\theta$ represents an amount by which the motor 140 is to be rotated for equalizing the actual rotational angle θ to the target rotational angle $\theta^*$.

The two terms of the right side of the above expression can be considered to be components of the target electric current amount i*. The component of the first term is a proportional-term electric-current component $i_h$ based on the rotational angle deviation $\Delta\theta$, while the component of the second term is an integral-term electric-current component is based on an integral value of the rotational angle deviation $\Delta\theta$. The actuator 126 is actuated while receiving an external force such as elasticity of the L-shaped bar 122. Therefore, from the point of view of theory of the PI control rule, the integral-term electric-current component is can be considered as an electric-current component required to inhibit the motor 140 from being rotated by the external force, namely, a component of the motor force required to maintain an operating position of the actuator 126 under application of the external force thereto. The proportional-term electric-current component $i_h$ can be considered as an electric-current component required to cause the actuator 126 to be suitably actuated under application of the external force thereto, namely, a component of the motor force required to cause the actuator 126 to be actuated against the external force.

Figure 9:
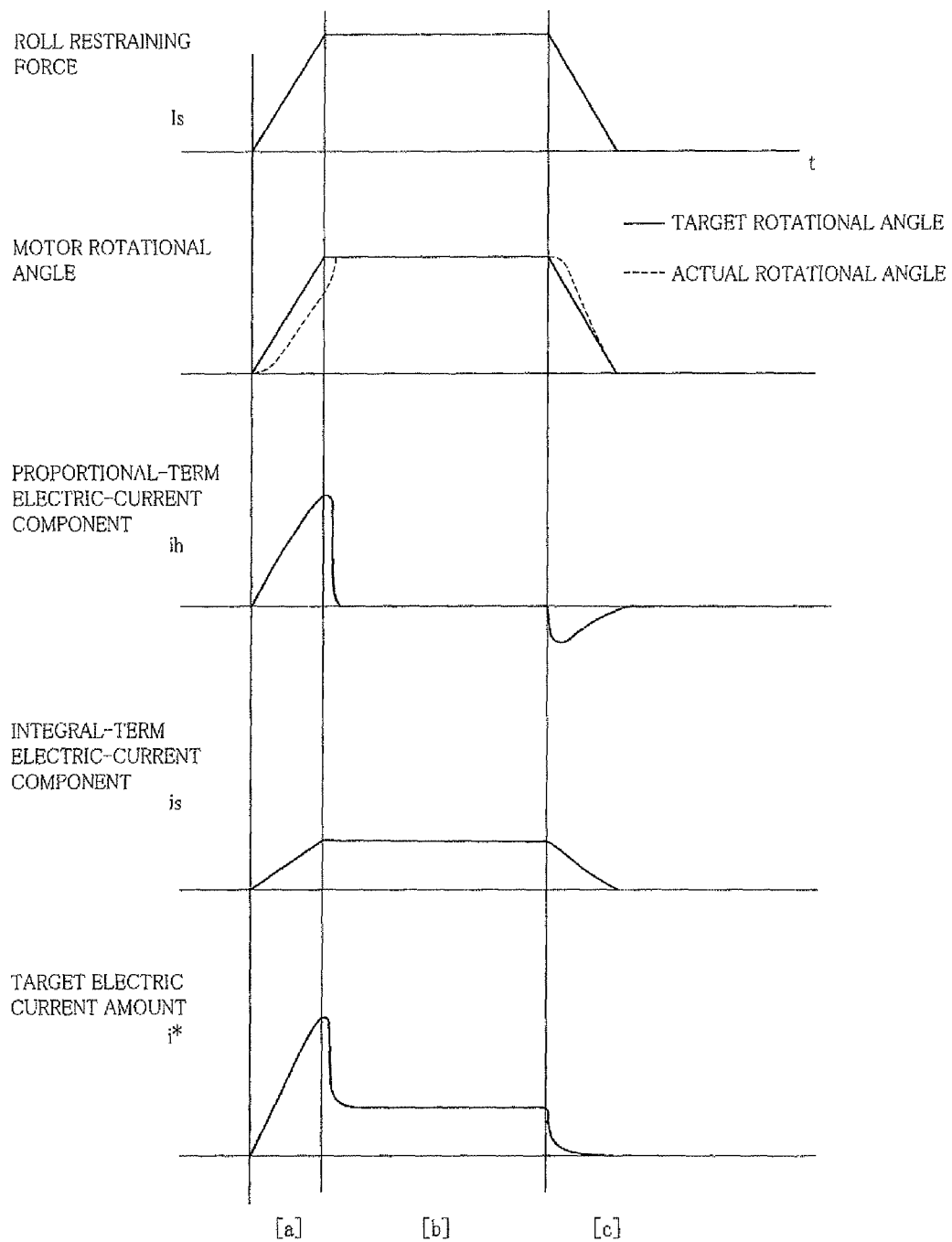
FIG. 9 is a chart conceptually showing chronological changes of roll restraining force, target motor rotational angle, actual motor rotational angle, proportional-term electric-current component, integral-term electric-current component and target electric current amount, during typical turning of the vehicle.

The above-described integral-term electric-current component is may be an electric-current component that is required for generating the motor force whose amount is dependent on the negative efficiency $\eta_N$, since the integral-term electric-current component is may be, generally, in view of the actuator efficiency, an electric-current component that is required for maintaining the rotational angle θ of the motor 140. Therefore, the integral gain $K_I$ as a gain of the second term of the right side of the above expression (for determining the target electric current amount i*) is set such that the integral-term electric-current component is dependent on the negative-efficiency characteristic. For example, in execution of the roll restraining control for restraining the roll caused during turning of the vehicle, as shown in FIG. 9, the displacement force, i.e., the roll restraining force that is to be generated by the adjuster device 120 is changed whereby the target rotational angle θ* of the motor 140 is changed. In this example, the integral-term electric-current component is determined in accordance with the negative efficiency $\eta_N$ such that the rotational angle θ of the motor 140 is substantially held in the target rotational angle θ* throughout an initial stage [a], an intermediate stage [b] and a final stage [c] of the turning of the vehicle.

On the other hand, the above-described proportional-term electric-current component $i_h$ is provided for eliminating the deviation of the actual rotational angle θ from the target rotational angle θ* under application of an external force, and the proportional gain $K_P$ as a gain of the first term of the right side of the above expression is set such that the proportional-term electric-current component $i_h$ is compensated (increased or reduced) suitably depending on the rotational angle deviation Δθ. Particularly, in the initial stage [a] in which the actuator 126 has to be actuated against application of the external force, the motor 140 has to be supplied with the electric current whose amount enables generation of the motor force such that an amount of the generated motor force is not smaller than an amount dependent on the positive efficiency characteristic. In view of this, the proportional gain $K_P$ is set to a value that enables generation of the motor force according to the positive efficiency characteristic without the rotational angle deviation Δθ being considerably increased.

Like in the roll restraining control as described above, in the pitch restraining control, vibration damping control and a control integrating these controls, the positive efficiency $\eta_P$ and the negative efficiency $\eta_N$ of the actuator 126 are taken into account, by determining the target electric current amount i* according to the above expression in which the proportional gain $K_P$ and the integral gain $K_I$ are suitably set. Therefore, owing to the determination of the target electric current amount i* with the positive efficiency $\eta_P$ and the negative efficiency $\eta_N$ of the actuator 126 being taken into account, it is possible to effectively reduce an amount of the electric power consumed by the electromagnetic motor 140 in a state in which the rotational angle θ of the motor 140 is held unchanged or reduced, namely, in a state in which the motor force (i.e., the actuator force or displacement force) is held unchanged or reduced.

The direction of the motor force generated by the electromagnetic motor 140 is dependent on whether the target electric current amount i* is a positive value or a negative value. In control of drive of the motor 140, the duty ratio and the direction of the generated motor force are determined based on the target electric current amount i*. Then, a command indicative of the determined duty ratio and motor force direction is supplied to the inverter 174, so that the drive of the motor 140 is controlled based on the command by the inverter 174. Thus, each of the four adjuster devices 120 is configured to generate the displacement force that is to be generated, thereby restraining undesirable motion of the vehicle body such as roll and pitch of the vehicle body and damping the sprung-portion vibration.

(ii) Controls of Hydraulic Damper

In the present system 10, due to employment of the actuator 126 whose positive/negative efficiency product $\eta_P \cdot \eta_N$ is relatively low, for example, each adjuster device 120 has a difficulty in coping with vibrations of relatively high frequency. In view of this, each hydraulic damper 56 included in the system 10 is provided by a damper suitable for damping vibrations of relatively high frequency, so that transmission of the vibrations of relatively high frequency to the vehicle body is restrained by operation of the damper 56. That is, in the present system 10, the vibrations of low frequency range including a resonance frequency of the sprung member is coped with by the adjuster device 120, because the vibrations of the low frequency range can be followed by operation of the actuator 126. Meanwhile, the vibrations of high frequency range including a resonance frequency of the unsprung member is coped with by the damper 56. For assuring this function, the damper 56 has a damping coefficient that is tuned to be low as much as possible.

Figure 10:
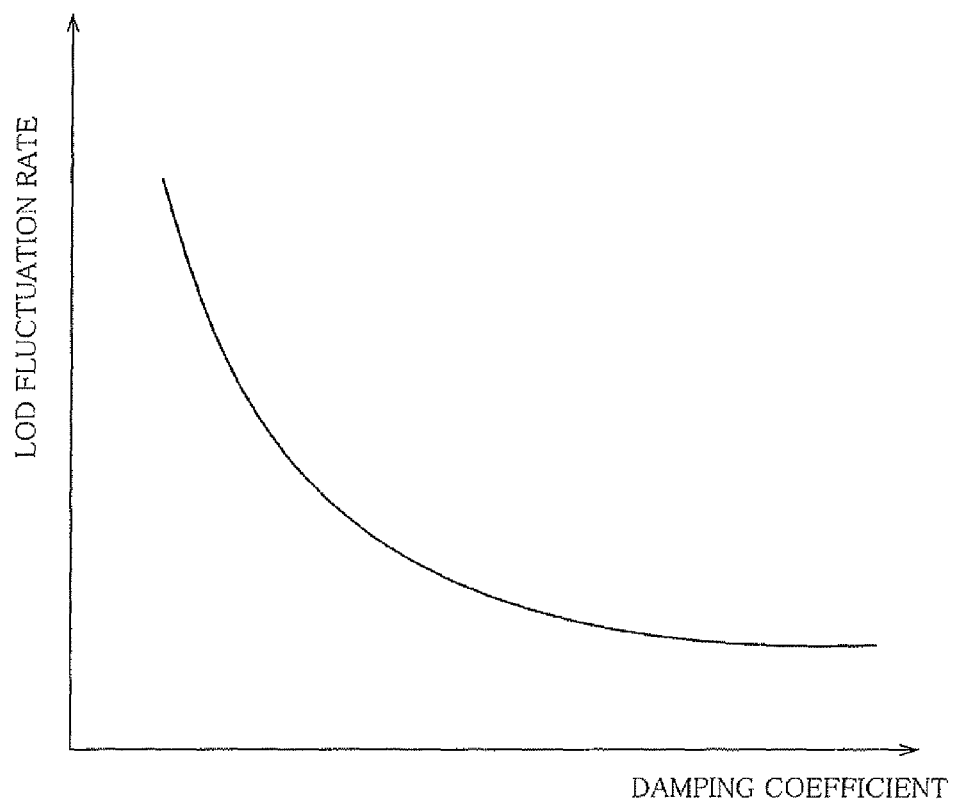
FIG. 10 is a graph conceptually showing a relationship between damping coefficient and load fluctuation rate upon occurrence of unsprung-portion resonance frequency vibration.

The value of the damping coefficient of the hydraulic damper 56 affects not only transmittability of vibration from the unsprung portion to the sprung portion but also road-holding ability of the wheel. Specifically described, as shown in FIG. 10, with respect to fluctuation of a load applied to a contact portion of the wheel which is in contact with a road surface, a rate of fluctuation of the load applied to the contact portion of the wheel upon occurrence of vibrations of the unsprung-member resonance frequency range is increased with reduction of the damping coefficient. Particularly, when the damping coefficient is reduced to a certain degree, the load fluctuation rate is considerably increased, as is understood from FIG. 10. The load fluctuation rate and the road-holding ability correlate with each other such that the road-holding ability is reduced with increase of the load fluctuation rate. Thus, the road-holding ability upon occurrence of vibrations of the unsprung-member resonance frequency range is reduced with reduction of the damping coefficient. That is, when the damping coefficient is reduced to a certain degree, the road-holding ability upon occurrence of vibrations of the unsprung-member resonance frequency range is considerably reduced. Therefore, in the present system 10, the damping coefficient of the hydraulic damper 56 is set by taking account of a suitable balance between the road-holding ability upon occurrence of vibrations of relatively high frequency range and the transmittability of vibrations of the relatively high frequency range. Specifically described, the damping coefficient of the damper 56 is set to 1500 N·sec/m (as a value obtained under an assumption that the hydraulic damping force is arranged to act directly on the wheel that is displaced relative to the vehicle body), which is lower than a half of 3000-5000 N·sec/m that is a damping coefficient of a conventional shock absorber of a suspension system not having the adjuster device 120.

In the present system 10 in which the damping coefficient of the hydraulic damper 56 is set as described above, it is possible to restrain transmission of vibrations of high frequency range (which are difficult to be damped by the adjuster device 120) to the sprung portion while obtaining a certain degree of the road-holding ability upon occurrence of vibrations of the high frequency range. However, since the hydraulic damping force generated by the hydraulic damper 56 acts against displacement of the sprung and unsprung portions relative to each other, there is a risk that the hydraulic damping force would affect the control of the adjuster device 120, particularly, the sprung-portion vibration damping control executed to cause the displacement force to act as the damping force against vibration of the sprung portion. That is, there is a risk that a force whose amount is dependent on the sprung-portion absolute velocity does not actually act on the sprung portion even when the adjuster device 12 generates the displacement force whose amount is dependent on the sprung-portion absolute velocity, because the hydraulic damping force acts on the sprung portion. In view of such a possible risk, it is desirable to minimize the hydraulic damping force upon execution of the sprung-portion vibration damping control.

In the present system 10, with the above-described things being taken into account, the hydraulic damping force is generated in case of occurrence of vibrations of the relatively high frequency range, for coping with the vibrations of the relatively high frequency range, and is inhibited from being generated in the other case, for eliminating influence of the hydraulic damping force affecting the control of the adjuster device 120. Described specifically, the hydraulic damper force is normally inhibited from being generated, by placing the electromagnetic clutch 72 in its deenergized state, and is allowed to be generated in response to displacement of the sprung and unsprung portions relative to each other, in case of occurrence of the unsprung-portion resonance frequency vibration, by placing the clutch 72 in its energized state. That is, when the unsprung-portion resonance frequency vibration is not occurring, a damping force reducing control is executed to reduce the amount of the hydraulic damping force to 0 (zero). In other words, in absence of the unsprung-portion resonance frequency vibration, there is executed a control in which as if the damping coefficient of the hydraulic damper 56 were tuned to 0 (zero). Thus, by suitably controlling the electromagnetic clutch 72 of the damper 56, it is possible to normally cause the displacement force generated by the adjuster device 120 to suitably act on the sprung portion, and to restrain transmission of vibrations of the relatively high frequency range to the sprung portion upon occurrence of the vibrations of the relatively high frequency range while restraining reduction of the road-holding ability of the wheel.

The judgment as to whether the unsprung-portion resonance frequency vibration is occurring or not can be made by seeing an intensity of a component of unsprung-portion resonance frequency range, which is extracted from the sprung-portion vibration through a suitable filtering procedure. Described specifically, the sprung-portion vertical acceleration $G_U$ is detected by the vertical acceleration sensor 196, and vibrations of the unsprung-portion resonance frequency range are extracted based on the detected sprung-portion vertical acceleration $G_U$, wherein the unsprung-portion resonance frequency range has a center corresponding to the unsprung-portion resonance frequency, and ranges from 3 Hz subtracted from the unsprung-portion resonance frequency to 3 Hz added to the unsprung-portion resonance frequency. Then, a maximum value $\alpha$ of amplitudes as the intensities of the vibrations of the unsprung-portion resonance frequency range is calculated. When the calculated maximum value $\alpha$ of amplitudes is larger than a threshold value $\alpha_1$, it is judged that the unsprung-portion resonance frequency vibration is occurring. That is, it is judged that the unsprung-portion resonance frequency vibration is occurring when the intensity of the unsprung-portion resonance frequency vibration is higher than a threshold intensity value, and it is judged that the unsprung-portion resonance frequency vibration is not occurring when the intensity of the unsprung-portion resonance frequency vibration is not higher than the threshold intensity value.

<Controlling Programs>

Figure 11:
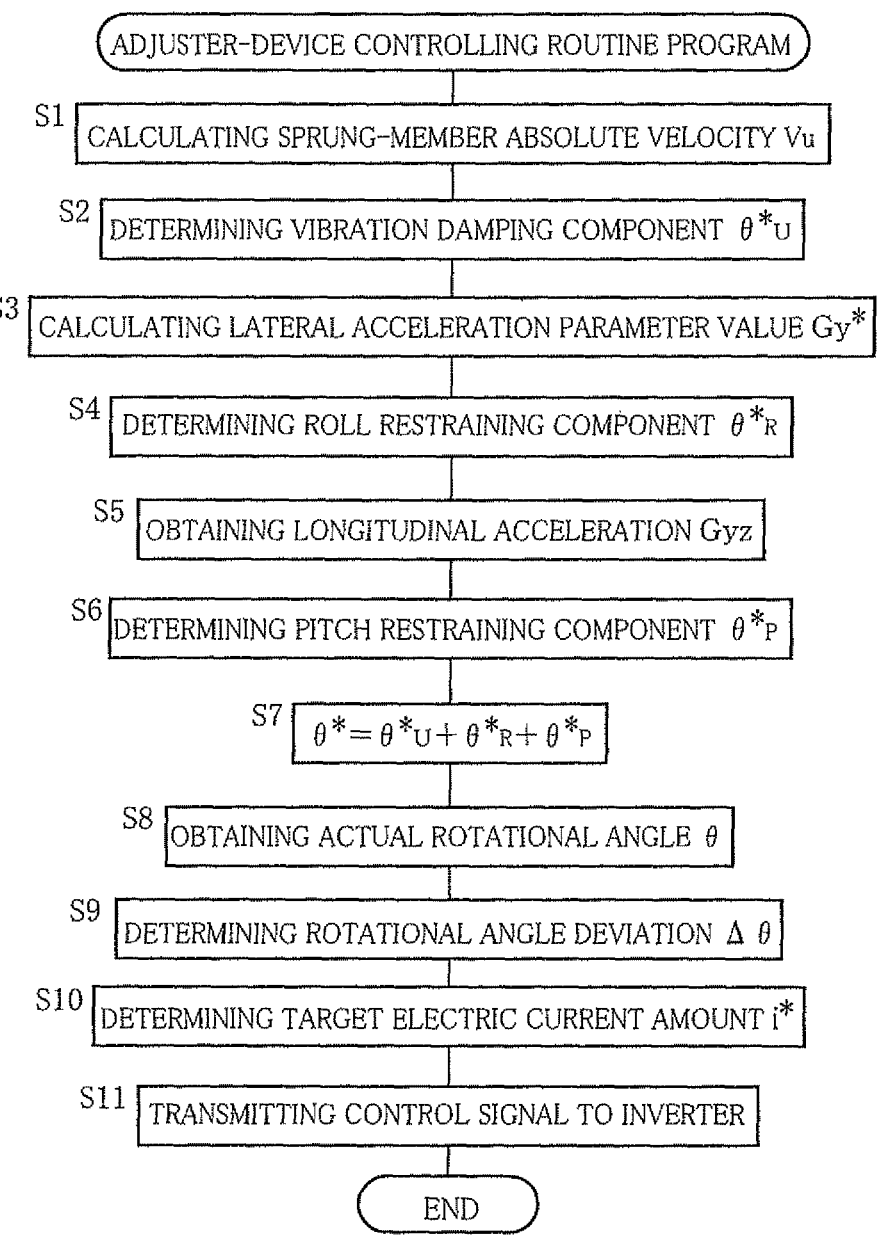
FIG. 11 is a flow chart showing an adjuster-device controlling routine program.
Figure 12:
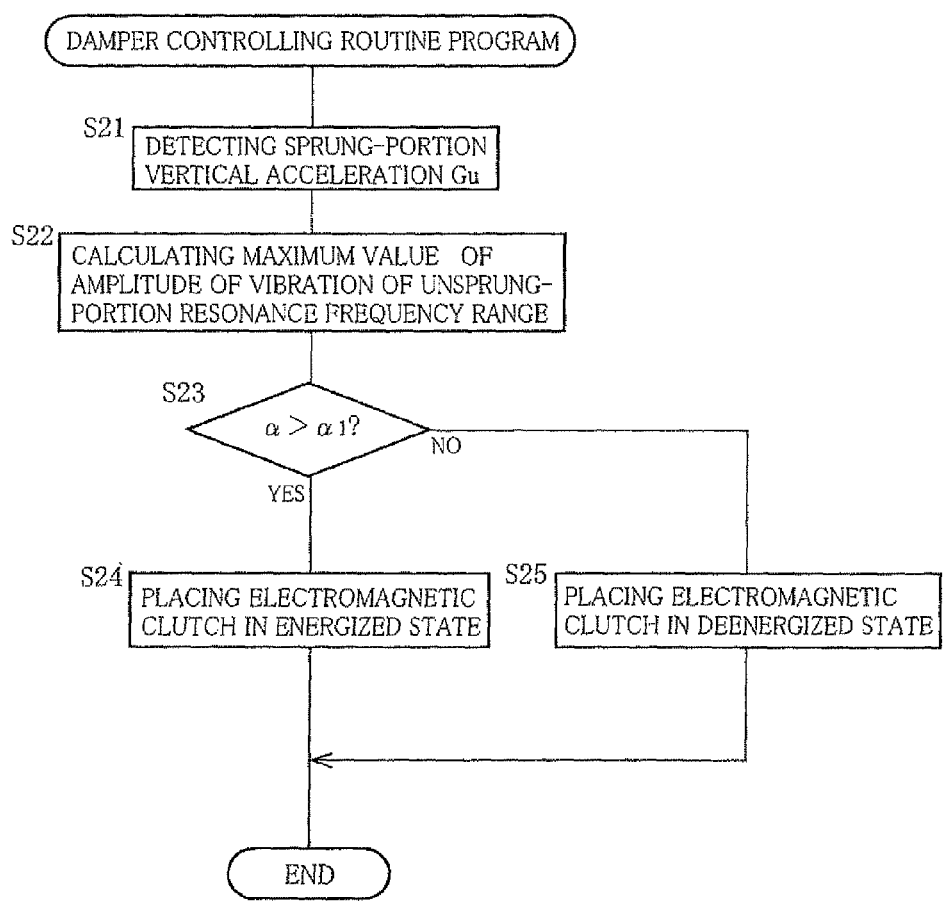
FIG. 12 is a flow chart showing a damper controlling routine program.

In the present system 10, the displacement force, which is to be generated by the adjuster device 120, is controlled through an adjuster-device controlling routine program that is executed by the adjuster controller 176, as shown in flow chart of FIG. 11. Meanwhile, the electromagnetic clutch 72 of the hydraulic damper 56 is controlled through a damper controlling routine program that is executed by the hydraulic damper controller 180, as shown in flow chart of FIG. 12. These two routine programs are concurrently and repeatedly executed at a short time interval (e.g., several tens of milliseconds), while an ignition switch of the vehicle is placed in its ON state. The routine programs will be described with reference to the flow charts of FIGS. 11 and 12. It is noted that the adjuster-device controlling routine program is executed for each one of the actuators 126 of the respective four adjuster devices 120, and that the damper controlling routine program is executed for each one of the electromagnetic clutches 72 of the respective four hydraulic dampers 56. In the following description, control procedures for one of the actuators 126 and control procedures for one of the electromagnetic clutches 72 will be described in the interest of simplification of the description.

(i) Adjuster-Device Controlling Routine Program

The adjuster-device controlling routine program is initiated with step S1 that is implemented to calculate the sprung-portion absolute velocity Vu, based on the sprung-portion vertical acceleration Gu detected by the vertical acceleration sensor 196. Step S1 is followed by step S2 in which the vibration damping target rotational angle component $\eta^*_U$ directed to the sprung-portion vibration damping control is determined based on the calculated sprung-portion absolute velocity Vu. Then, step S3 is implemented to calculate the lateral acceleration parameter value Gy*, based on the lateral acceleration measured value Gyr (detected by the lateral acceleration sensor 192) and the lateral acceleration estimated value Gyc. Step S3 is followed by step S4 in which the roll restraining target rotational angle component $\theta^*_R$ directed to the roll restraining control is determined based on the calculated lateral acceleration parameter value Gy*. Then, step S5 is implemented to detect the longitudinal acceleration Gzg through the longitudinal acceleration sensor 194. Step S5 is followed by step S6 in which the pitch restraining target rotational angle component $\theta^*_P$ directed to the pitch restraining control is determined based on the detected longitudinal acceleration Gzg. Then, step S7 is implemented to determine the target motor rotational angle $\theta^*$ as a sum of the vibration damping component $\theta^*_U$, roll restraining component $\theta^*_R$ and pitch restraining component $\theta^*_P$. After determination of the target motor rotational angle $\theta^*$, the actual rotational angle $\theta$ is obtained based on a value detected by the motor rotational angle sensor 154 in step S8, and the deviation $\Delta\theta$ of the actual rotational angle $\theta$ from the target rotational angle $\theta^*$ is determined in step S9. Then, in step S10, the target electric current amount i* is determined based on the rotational angle deviation $\Delta\theta$ and the above-described expression in accordance with the PI control rule. One cycle of execution of the adjuster-device controlling routine program is completed with step S11 in which a control signal based on the determined target electric current amount i* is transmitted to the inverter 174.

(ii) Damper Controlling Routine Program

In the damper controlling routine program, firstly, it is determined whether the unsprung-portion resonance frequency vibration is occurring or not. Described specifically, this routine program is initiated with step S21 in which the sprung-portion vertical acceleration Gu is detected by the vertical acceleration sensor 196. Then, in step S22, the maximum value $\alpha$ of amplitudes of vibrations of the unsprung-portion resonance frequency range is calculated, after the vibrations of the unsprung-portion resonance frequency range have been extracted through the filtering procedure. Step S22 is followed by step S23 that is implemented to judge whether the calculated maximum value $\alpha$ of amplitudes is larger than the threshold value $\alpha_1$. When it is judged the maximum value $\alpha$ of amplitudes is larger than the threshold value $\alpha_1$, it is judged that the unsprung-portion resonance frequency vibration is occurring, and the control flow goes to step S24 in which a command requesting the electromagnetic clutch 72 to be placed in the energized state is directed to the driver 178. When it is judged the maximum value $\alpha$ of amplitudes is not larger than the threshold value $\alpha_1$, it is judged that the unsprung-portion resonance frequency vibration is not occurring, and the control flow goes to step S25 in which a command requesting the electromagnetic clutch 72 to be placed in the deenergized state is directed to the driver 178.

<Construction of Controller>

Figure 13:
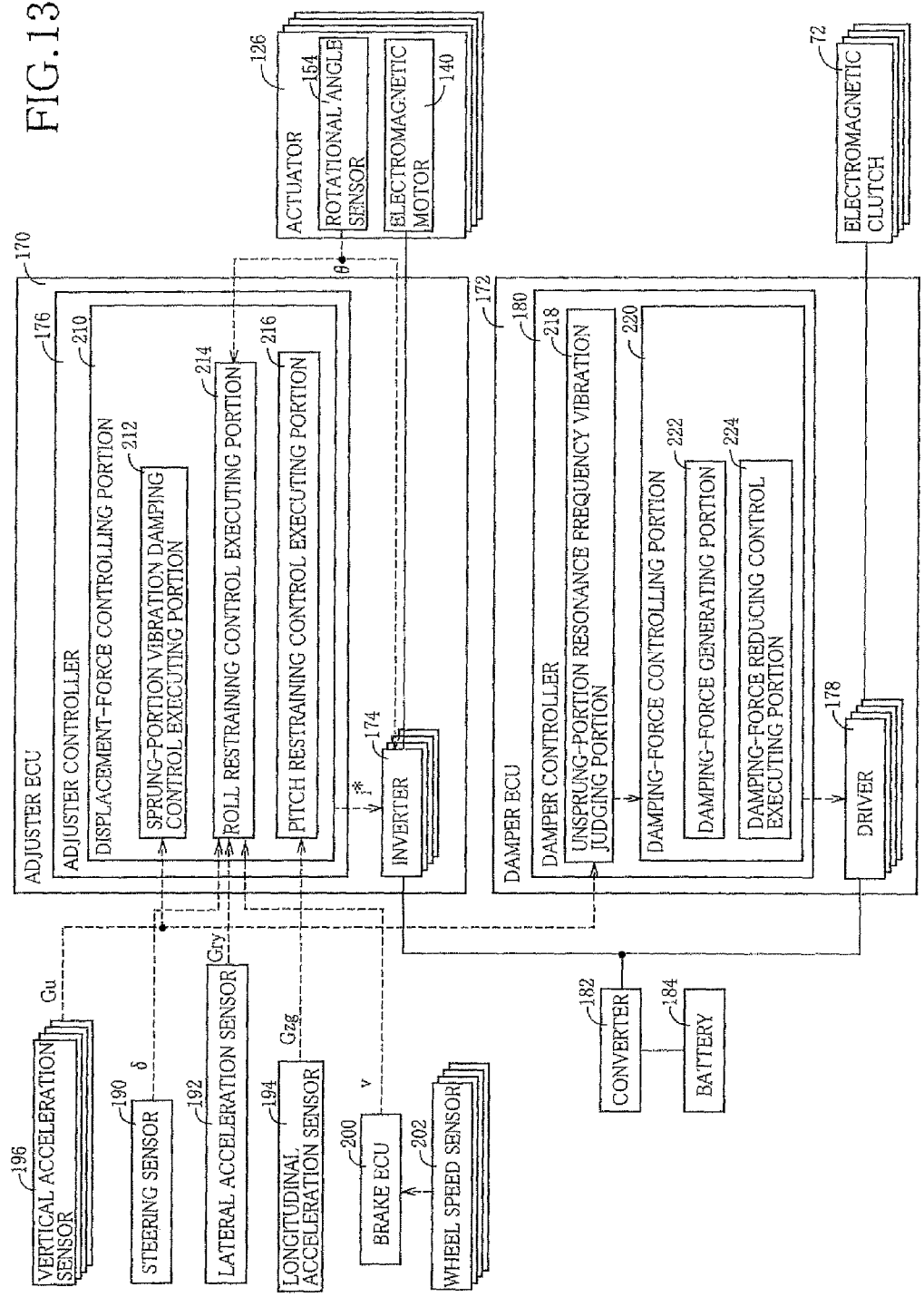
FIG. 13 is a block diagram showing various functional portions of a controller for controlling the suspension system.

The adjuster controller 176, which executes the above-described adjuster-device controlling routine program, can be considered to include functional portions as shown in FIG. 13, in view of the procedures in the execution of the controlling routine program. As is understood from FIG. 13, the adjuster controller 176 has a displacement-force controlling portion 210 as a functional portion assigned to implement steps S1 through S11, namely, as a functional portion configured to control the displacement force that is to be generated by the adjuster device 120. The displacement-force controlling portion 210 has a sprung-portion vibration damping control executing portion 212, a roll restraining control executing portion 214 and a pitch restraining control executing portion 216. The sprung-portion vibration damping control executing portion 212 is a functional portion assigned to implement steps S1 and S2, namely, a functional portion configured to execute the sprung-portion vibration damping control. The roll restraining control executing portion 214 is a functional portion assigned to implement steps S3 and S4, namely, a functional portion configured to execute the roll restraining control. The pitch restraining control executing portion 216 is a functional portion assigned to implement steps S5 and S6, namely, a functional portion configured to execute the pitch restraining control.

The damper controller 180, which executes the above-described damper controlling routine program, also can be considered to include functional portions as shown in FIG. 13, in view of the procedures in the execution of the controlling routine program. As is understood from FIG. 13, the damper controller 180 has an unsprung-portion resonance frequency vibration judging portion 218 and a damping-force controlling portion 220. The unsprung-portion resonance frequency vibration judging portion 218 is a functional portion assigned to implement steps S21 through S23, namely, a functional portion configured to judge whether the unsprung-portion resonance frequency vibration is occurring or not. The damping-force controlling portion 220 is a functional portion assigned to implement steps S24 and S25, namely, a functional portion configured to control the hydraulic damping force that is to be generated by the hydraulic damper 56. The damping force controlling portion 220 has a damping-force generating portion 222 and a damping-force reducing control executing portion 224. The damping-force generating portion 222 is a functional portion assigned to implement step S24, namely, a functional portion configured to generate the hydraulic damping force. The damping-force reducing control executing portion 224 is a functional portion assigned to implement step S25, namely, a functional portion configured to execute the damping-force reducing control by inhibiting generation of the hydraulic damping force.

(B) Second Embodiment

<Construction of Vehicle Suspension System>

Figure 14:
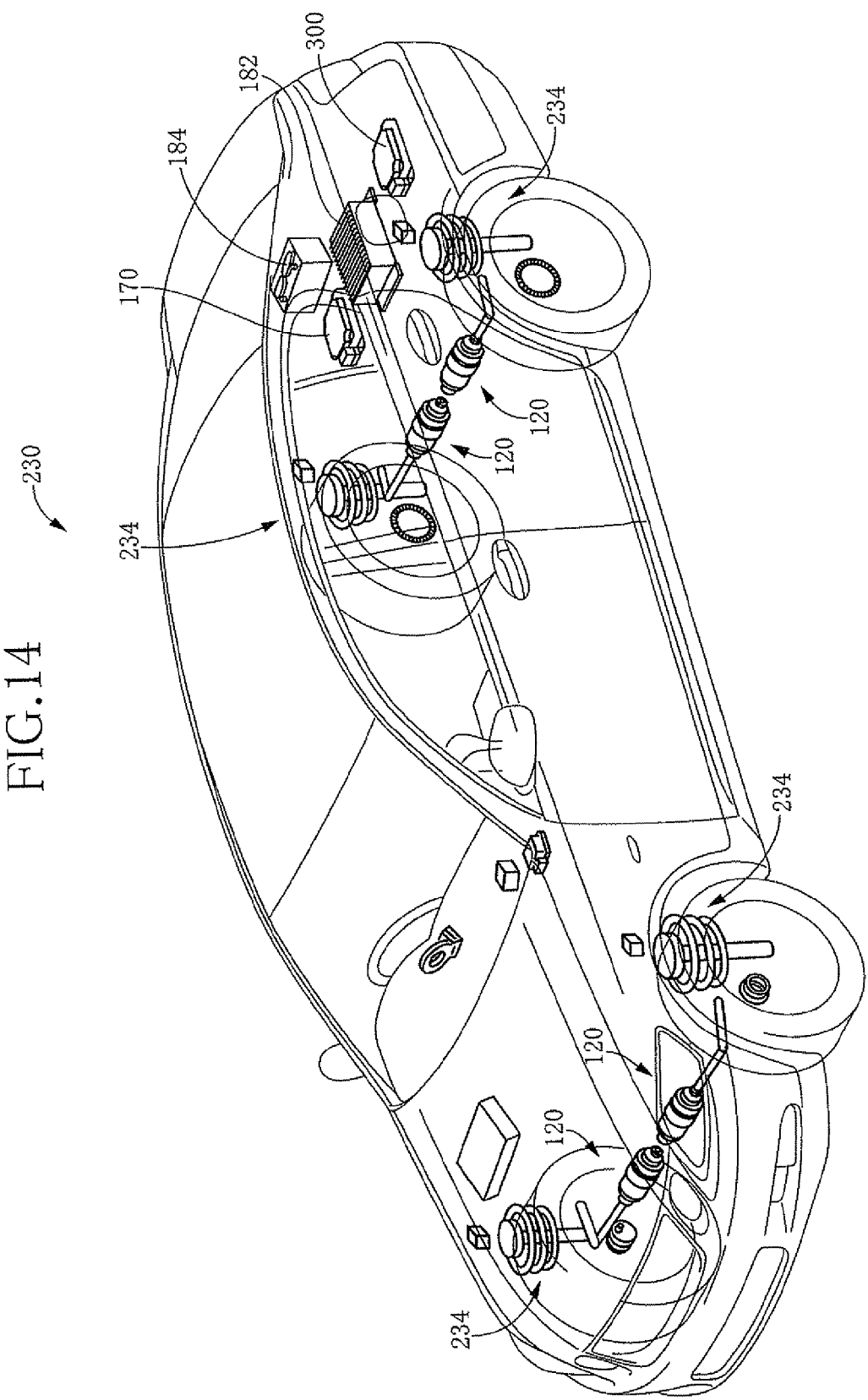
FIG. 14 is a view schematically showing an overall construction of a suspension system for a vehicle, which is constructed according to a second embodiment of the invention.

FIG. 14 schematically shows a vehicle suspension system 230 that is constructed according to a second embodiment of the invention. The above-described suspension system 10 according to the first embodiment is equipped with the hydraulic dampers 56 of rotary type. However, the present suspensions system 230 is equipped with hydraulic dampers 232 of cylinder type. In the following description regarding the suspensions system 230, the same reference signs as used in the above-described suspension system 10 will be used to identify the functionally corresponding elements, and redundant description of these elements is not provided.

Figure 15:
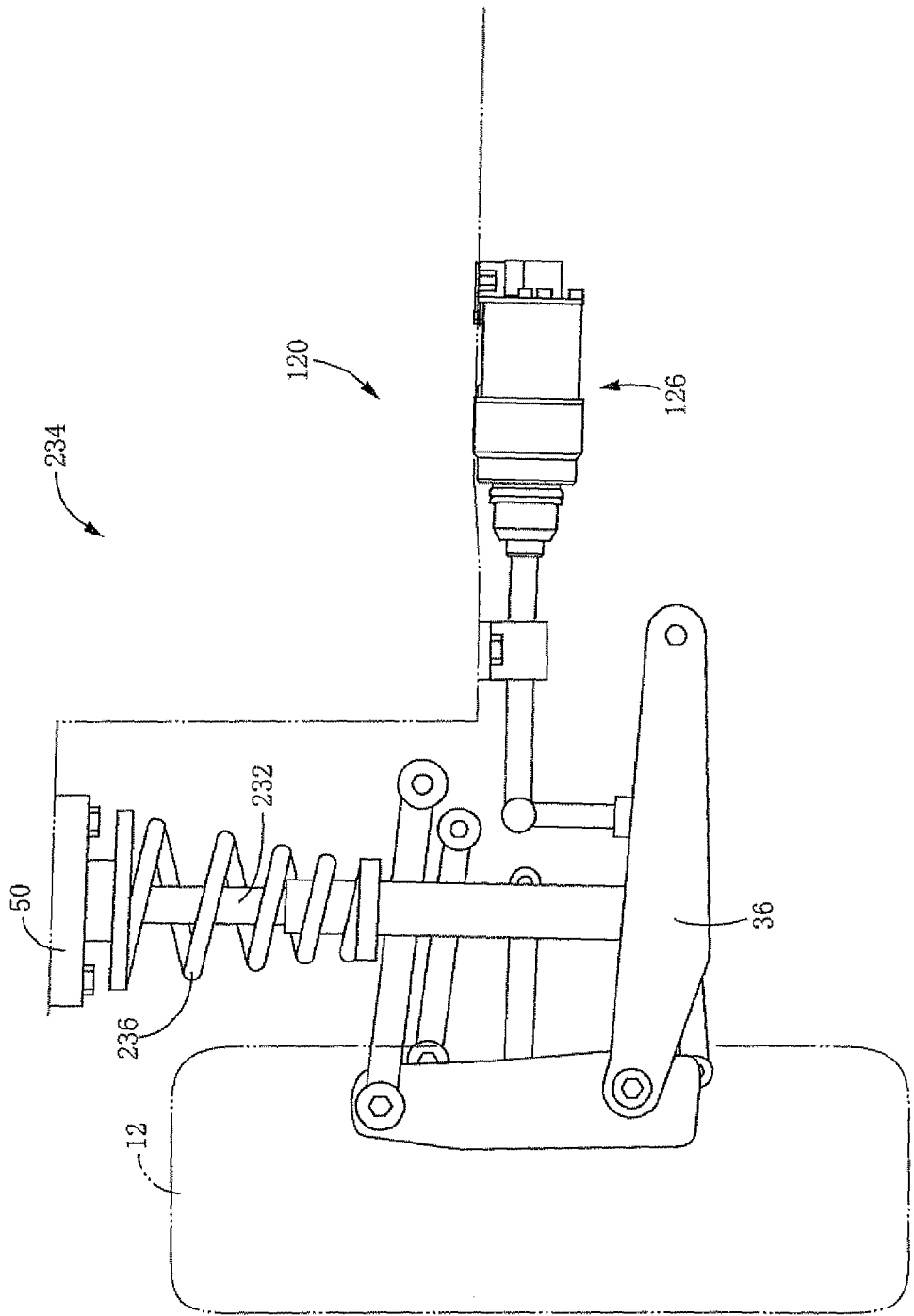
FIG. 15 is a view of a suspension device provided in the suspension system of FIG. 14, as seen from a rear side of the vehicle.

The suspension system 230 includes four suspension devices 234 that are provided for respective four wheels 12 (i.e., front right, front left, rear right and rear left wheels 12). As shown in FIG. 15, each suspension device 234 of independent type is provided by a multi-link suspension, and is equipped with an arm assembly as the wheel holder, like each suspension device 20 of the above-described suspension system 10 according to the first embodiment. Each suspension device 234 has a coil spring 236 as the suspension spring and the hydraulic damper 232 of cylinder type, which are disposed in parallel with each other between the mount portion 54 and the second lower arm 36.

Figure 16:
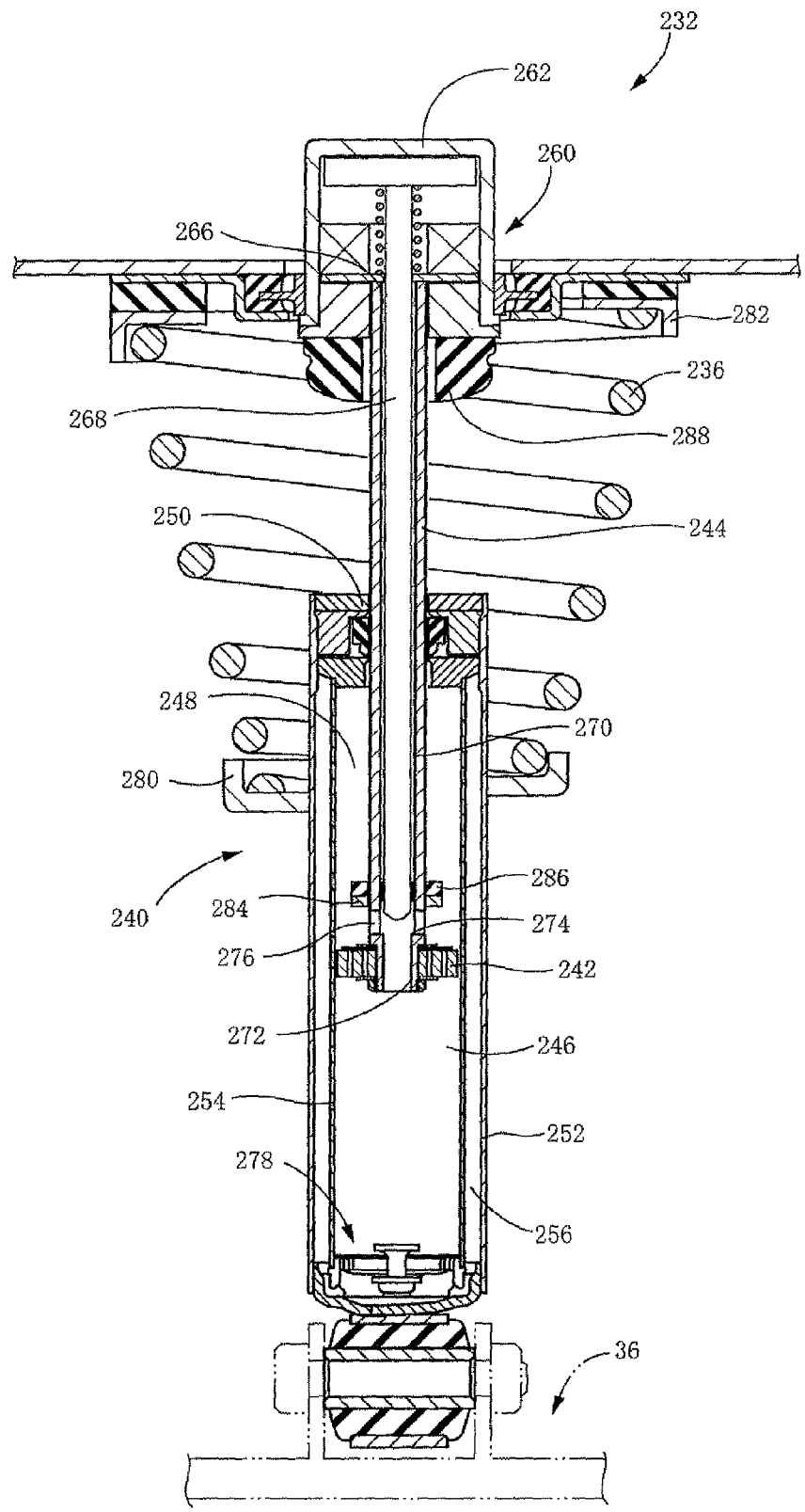
FIG. 16 is a view, partially in cross section, showing a hydraulic damper that is included in the suspension device of FIG. 15.

As shown in FIG. 16, the hydraulic damper 232 is constructed to include a generally tubular-shaped damper housing 240, a piston 242 and a piston rod 244. The damper housing 240 is connected to the second lower arm 36, and stores a working fluid therein. The piston 242 is fluid-tightly and slidably fitted inside the damper housing 240. The piston rod 244 has a lower end portion connected to the piston 242, and an upper end portion projecting upwardly from the damper housing 240. The piston rod 244 extends through a cap portion 250 that is provided in an upper portion of the damper housing 240, and is in sliding contact with the cap portion 250 via a seal. An inside space of the damper housing 240 is divided by the piston 242 into an upper chamber 248 and a lower chamber 246 that are located on respective upper and lower sides of the piston 242. The damper 232 is of twin-tube type, so that the damper housing 240 is constructed to include an outer cylinder 252 and an inner cylinder 254 such that a reservoir chamber 256 is defined between the outer and inner cylinders 252, 254. The piston 242 is fluid-tightly and slidably fitted inside the inner cylinder 254.

The hydraulic damper 232 is provided with a solenoid 260 having a housing 262 that is connected at its peripheral portion to the mount portion 50 via a rubber cushion. An upper end portion of the piston rod 244 is fixedly connected to a lower portion of the housing 262 of the solenoid 260, whereby the piston rod 244 is fixed relative to the mount portion 50. The piston rod 244 is hollow-like shaped, so as to have a through-hole 266 extending therethrough. A rod 268 of the solenoid 260 is introduced in the through-hole 266 so as to be axially movable, so that the rod 268 is axially moved upon activation of the solenoid 260.

The through-hole 266 of the piston rod 244 has a large diameter portion 270 and a small diameter portion 272 that extends downwardly from the large diameter portion 270. A step portion 274 is provided in a boundary between the large diameter portion 270 and the small diameter portion 272 of the through-hole 266. A communication passage 276 is provided on an upper side of the step portion 274, so as to allow communication between the upper chamber 248 and the through-hole 266. The upper chamber 248 and the lower chamber 246 are held in communication with each other via the communication passage 276 and the through-hole 266. In the large diameter portion 270 of the through-hole 266, the above-described rod 268 of the solenoid 260 is inserted from an upper end portion of the piston rod 244. The rod 268 has a lower end portion that is introducible into the small diameter portion 272 of the through-hole 266. The rod 268 has an outside diameter that is larger than an inside diameter of the small diameter portion 272 of the through-hole 266, so that the small diameter portion 272 of the through-hole 266 can be closed by the lower end portion of the rod 268 upon downward movement of the rod 268. That is, when the solenoid 260 is placed in its deenergized state, the upper and lower chambers 248, 246 are held in communication with each other via the communication passage 276 and the through-hole 266. When the solenoid 260 is placed in its energized state, the through-hole 266 is closed by the rod 268 of the solenoid 260 whereby the communication of the upper and lower chambers 248, 246 via the communication passage 276 and the through-hole 266 is cut off.

When the through-hole 266 is closed with the solenoid 260 being placed in its energized state, the hydraulic damper 232 allows transfer of the working fluid between the upper and lower chambers 248, 246 via vertically extending communication passages formed through the piston 242, upon displacement of the piston 242. In this instance, a flow restrictor provided in each of the vertically extending communication passages applies resistance to the transfer of the working fluid between the upper and lower chambers 248, 246. Further, a base valve body 278 disposed between the lower chamber 246 and the reservoir chamber 264 applies resistance to transfer of the working fluid between the lower chamber 246 and the reservoir chamber 264. On the other hand, when the through-hole 266 is open with the solenoid 260 being placed in its deenergized state, the transfer of the working fluid between the upper and lower chambers 248, 246 upon displacement of the piston 242 is made mainly through the through-hole 266, with no substantial resistance applied to the transfer of the working fluid. In this instance, however, the transfer of the working fluid between the lower chamber 246 and the reservoir chamber 264 is given resistance by the base valve body 278.

Owing to the construction as described above, the hydraulic damper 232 is configured to generate a damping force which is based on the resistance force applied to the transfer of the working fluid caused by displacement of the piston 242 and which acts against the displacement of the piston 242, i.e., displacement of the sprung and unsprung portions toward and away from each other. Further, the damper 232 is capable of changing an amount of the damping force by operation of the solenoid 260, without depending on relative velocity of the sprung and unsprung portions. In other words, the damper 232 is constructed to be capable of changing its damping coefficient, i.e., damping characteristic against displacement of the sprung and unsprung portions relative to each other.

The damper 232 has a damping force changer that is at least partially constituted by the solenoid 260, through-hole 266 and communication passage 276. The damping force changer has a function of changing the damping coefficient of the damper 232.

A lower retainer 280 having an annular shape is mounted on an outer peripheral portion of the damper housing 240. An upper retainer 282 having an annular shape is disposed on a lower surface of the mount portion 50, with a rubber vibration isolator being interposed between the upper retainer 282 and the lower surface of the mount portion 50. The coil spring 236 is interposed between the upper and lower retainers 282, 280 so as to be supported by the retainers 282, 280. An annular member 284 is fixedly mounted on an outer peripheral portion of a portion of the piston rod 244 which is accommodated in the upper chamber 248. An annular cushion rubber 286 is bonded onto an upper surface of the annular member 284. A tubular cushion rubber 288 is bonded onto a lower surface of the solenoid 260. When the vehicle body and the wheel are relatively moved in a rebound direction, i.e., a direction away from each other by a certain distance, the annular member 284 is brought into contact with a lower surface of the cap portion 250 of the damper housing 240 through the cushion rubber 286. On the other hand, when the vehicle body and the wheel are relatively moved in a bound direction, i.e., a direction toward each other by a certain distance, an upper surface of the cap portion 250 is brought into contact with the lower surface of the solenoid 260 through the tubular cushion rubber 288. That is, the damper 232 has a bound stopper and a rebound stopper, i.e., stoppers against the relative displacement of the vehicle body and the wheel toward and away from each other.

In the present suspension system 230, as shown in FIG. 14, an adjuster electronic control unit (adjuster ECU) 170 is provided for controlling the four adjuster devices 120, and a damper electronic control unit (damper ECU) 300 is provided for controlling the four dampers 232. Thus, the controller of the present suspension system 230 is constructed to include the two ECUs 170, 300. The damper ECU 300 is configured to control operations of the solenoids 260 of the respective dampers 232, and includes four drivers 302 serving as drive circuits and a damper controller 304 that is constituted principally by a computer including CPU, ROM and RAM (see FIG. 18). The drivers 302 are connected to a battery 184 via a converter 182, and are connected to the solenoids 260 of the respective dampers 232. Further, the damper controller 304 is connected to the drivers 302, so that the operations of the solenoids 260 are controllable by controlling the drivers 302.

<Controls of Suspension System for Vehicle>

Like in the above-described suspension system 10, in the present suspension system 230, the displacement forces generated by the respective adjuster devices 120 are controllable independently of each other, thereby making it possible to execute the sprung-portion vibration damping control, roll restraining control and pitch restraining control. Further, like each hydraulic damper 56 of the above-described system 10, each hydraulic damper 232 of the present system 230 is disposed in parallel with the corresponding adjuster device 120, so that the hydraulic damping force generated by the damper 232 acts on the sprung and unsprung portions. Thus, there is a risk that the control of the adjuster device 120 could be affected by the hydraulic damping force generated by the damper 232. Therefore, in the present system 230, too, the damping force reducing control is executed by taking account of the road-holding ability of the wheel and the influence of the hydraulic damping force affecting the control of the adjuster device 120. However, in the present system 230, the damping force reducing control is not a control for inhibiting generation of the hydraulic damping force but a control for reducing the damping coefficient of the hydraulic damper 232.

The damping coefficient is normally made low so as to reduce influence of the hydraulic damping force affecting control of the adjuster device 120, and is increased in case of occurrence of the unsprung-portion resonance frequency vibration so as to increase the road-holding ability of the wheel upon occurrence of the unsprung-portion resonance frequency vibration. Described specifically, the through-hole 266 is normally held open by placing the solenoid 260 in its deenergized state so as to reduce the damping coefficient, i.e., the damping characteristic against displacement of the sprung and unsprung portions toward and away from each other, and is closed by placing the solenoid in its energized state in case of occurrence of the unsprung-portion resonance frequency vibration so as to increase the damping coefficient. The damping coefficient of the hydraulic damper 232, when the through-hole 266 is closed, is set to 1500 N·sec/m (as a value obtained under an assumption that the hydraulic damping force is arranged to act directly on the wheel that is displaced relative to the vehicle body) by taking account of a suitable balance between the road-holding ability upon occurrence of vibrations of relatively high frequency range and transmittability of vibrations of the relatively high frequency range. The damping coefficient of the damper 232, when the through-hole 266 is open, is set to 500 N·sec/m which is about one-tenth to one-sixth as low as 3000-5000 N·sec/m as a damping coefficient of a conventional shock absorber of a suspension system. Therefore, in the present system 230, it is possible to reduce influence of the hydraulic damping force affecting the control of the adjuster device 120 when the unsprung-portion resonance frequency vibration is not occurring.

<Controlling Programs>

Figure 17:
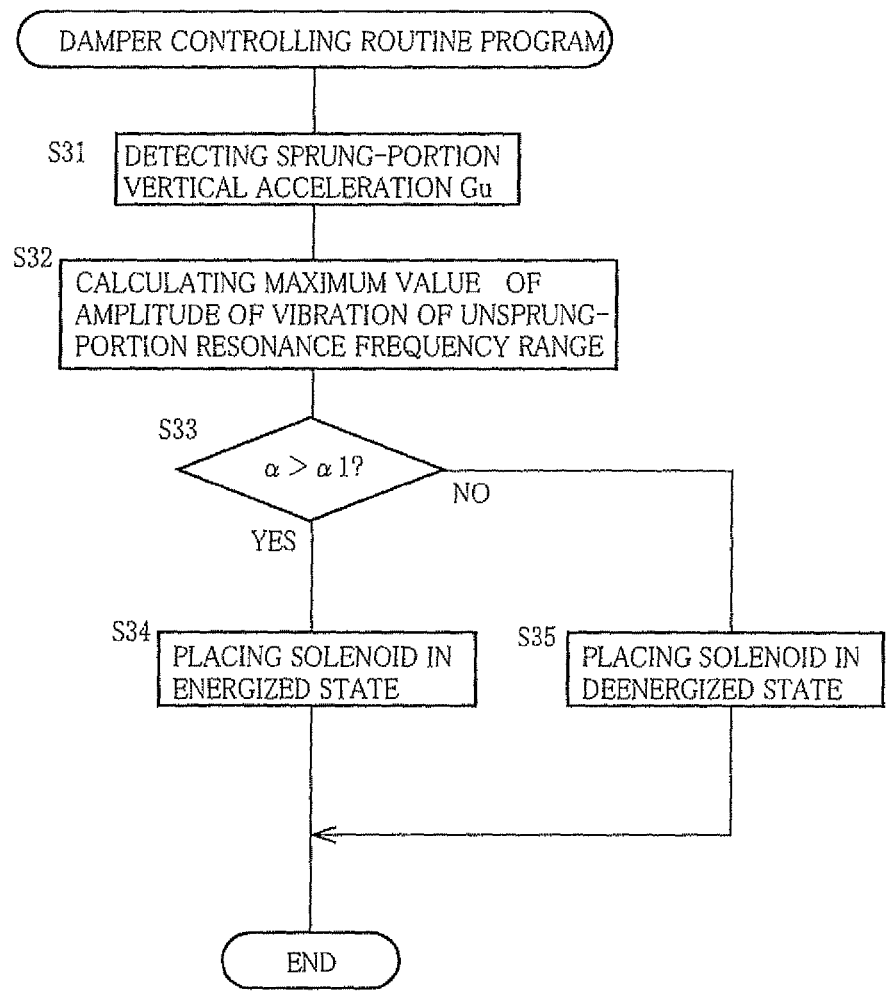
FIG. 17 is a flow chart showing a damper controlling routine program.

In the present system 230, as in the present system 10, the adjuster device 120 is controlled through the adjuster-device controlling routine program that is executed by the adjuster controller 176, as shown in flow chart of FIG. 11. Meanwhile, the solenoid 260 of the hydraulic damper 232 is controlled through a damper controlling routine program that is executed by the hydraulic damper controller 304, as shown in flow chart of FIG. 17. These two routine programs are concurrently and repeatedly executed at a short time interval (e.g., several tens of milliseconds), while the ignition switch is placed in its ON state. Since the adjuster-device controlling routine program is the same as that in the above-described first embodiment, it will not be described. Since the damper controlling routine program is similar to that in the above-described first embodiment, it will be briefly described.

In the damper controlling routine program, like in the damper controlling routine program in the above-described first embodiment, it is first judged whether the unsprung-portion resonance frequency vibration is occurring or not in steps S31 through S33. When it is judged that the unsprung-portion resonance frequency vibration is occurring, a command requesting the solenoid 260 to be placed in its energized state is transmitted to the driver 302 in step S34. When it is judged that the unsprung-portion resonance frequency vibration is not occurring, a command requesting the solenoid 260 to be placed in its deenergized state is transmitted to the driver 302 in step S35, so as to execute the damping force reducing control.

<Construction of Controller>

The adjuster controller 176 of the adjuster ECU 170 (which executes the above-described adjuster-device controlling routine program) and the damper controller 302 of the damper ECU 300 (which executes the above-described damper controlling routine program) can be considered to include functional portions as shown in FIG. 18, in view of the procedures in the executions of the controlling routine programs. Since the functional portions included in the adjuster controller 176 of the adjuster ECU 170 are the same as those in the above-described first embodiment, they will not be described. Since the functional portions included in the damper controller 302 of the damper ECU 300 are similar to those included in the damper controller 180 of the damper ECU 172 in the above-described first embodiment, they will be briefly described.

The damper controller 302 has an unsprung-portion resonance frequency vibration judging portion 310 and a damping-force controlling portion 312. The unsprung-portion resonance frequency vibration judging portion 310 is a functional portion assigned to implement steps S31 through S33, namely, a functional portion configured to judge whether the unsprung-portion resonance frequency vibration is occurring or not. The damping-force controlling portion 312 is a functional portion assigned to implement steps S34 and S35, namely, a functional portion configured to control the hydraulic damping force that is to be generated by the hydraulic damper 232. The damping-force controlling portion 312 has a damping-coefficient increasing portion 314 and a damping-force reducing control executing portion 316. The damping-coefficient increasing portion 314 is a functional portion assigned to implement step S34, namely, a functional portion configured to increase the damping coefficient. The damping-force reducing control executing portion 316 is a functional portion assigned to implement step S35, namely, a functional portion configured to execute the damping-force reducing control by reducing the damping coefficient.

The invention claimed is:

1. A suspension system for a vehicle, comprising:
   (a) a suspension spring disposed between sprung and unsprung portions of the vehicle;
   (b) a hydraulic damper disposed in parallel with said suspension spring, and configured to generate a damping force against displacement of the sprung and unsprung portions relative to each other such that an amount of the damping force is changeable by a damping force changer that is included in said damper;
   (c) a displacement force generator disposed in parallel with said suspension spring, and configured to generate, based on a motor force generated by an electromagnetic motor that is included in said displacement force generator, a displacement force causing the sprung and unsprung portions to be displaced toward or away from each other; and
   (d) a controller including a damping-force controlling portion configured to control said damping force changer, so as to control the damping force that is to be generated by said damper, and a displacement-force controlling portion configured to control actuation of said electromagnetic motor, so as to control the displacement force that is to be generated by said displacement force generator,
   wherein said displacement-force controlling portion is configured to execute a sprung-portion vibration damping control for controlling the displacement force that is to be generated by said displacement force generator, such that the generated displacement force acts as a damping force against sprung-portion vibration which occurs in the sprung portion,
   and wherein said damping-force controlling portion is configured, upon execution of the sprung-portion vibration damping control by said displacement-force controlling portion, to execute a damping force reducing control for reducing the damping force that is to be generated by said damper, depending on unsprung-portion resonance frequency vibration which occurs in the vehicle and which has a resonance frequency of the unsprung portion, such that the damping force generated by said damper is made smaller in a low intensity situation in which an intensity of the unsprung-portion resonance frequency vibration is not higher than a threshold intensity value, than in a high intensity situation in which the intensity is higher than the threshold intensity value.

2. The suspension system according to claim 1, wherein said damping force reducing control is executed to reduce the damping force that is to be generated by said damper such that a damping coefficient of said damper is not larger than 500 N·sec/m in said low intensity situation.

3. The suspension system according to claim 2, wherein said damping force reducing control is executed to reduce the damping force that is to be generated by said damper such that an amount of the generated damping force is substantially zero in said low intensity situation.

4. The suspension system according to claim 3,
wherein said damper includes a first interlocked portion that is interlocked with the sprung portion and a second interlocked portion that is interlocked with the unsprung portion, and is configured to generate the damping force against the displacement of the sprung and unsprung portions relative to each other, by generating a resistance force against displacement of said first and second interlocking portions relative to each other,
wherein said damping force changer includes an interlock releaser that is configured to release interlocking between the sprung portion and said first interlocking portion and/or interlocking between the unsprung portion and said second interlocking portion,
and wherein said damping-force controlling portion is configured, in the damping force reducing control, to cause said interlock releaser to release the interlocking between the sprung portion and said first interlocking portion and/or the interlocking between the unsprung portion and said second interlocking portion.

5. The suspension system according to claim 1, wherein said damping-force controlling portion is configured, upon execution of the sprung-portion vibration damping control, to control the damping force that is to be generated by said damper such that a damping coefficient of said damper is within a range from 1000 to 2000 N·sec/m in said high intensity situation.

6. The suspension system according to claim 1, wherein said displacement-force controlling portion is configured, in the sprung-portion vibration damping control, to control the displacement force that is to be generated by said displacement force generator such that an amount of at least one component of the generated displacement force is dependent on an absolute velocity of the sprung portion.

7. The suspension system according to claim 1, wherein said displacement-force controlling portion is configured to execute a posture change restraining control for restraining change of posture of a body of the vehicle, by controlling the displacement force that is to be generated by said displacement force generator such that at least one component of the generated displacement force acts as a roll restraining force for restraining roll of the body of the vehicle and/or a pitch restraining force for restraining pitch of the body of the vehicle.

8. The suspension system according to claim 1,
wherein said displacement force generator includes an elastic body connected at one of opposite end portions thereof to one of the sprung and unsprung portions, and an electromagnetic actuator which is disposed between the other of said opposite end portions of said elastic body and the other of the sprung and unsprung members and which interconnects said elastic body and said other of the sprung and unsprung members,
and wherein said electromagnetic actuator includes said electromagnetic motor, and is configured to generate an actuator force based on the motor force generated by said electromagnetic motor, such that the generated actuator force acts on said elastic body so as to change an amount of deformation of said elastic body that is dependent on an amount of actuation of said actuator, and such that the generated actuator force is transmitted to the sprung and unsprung portions via said elastic body so as to act as the displacement force.

9. The suspension system according to claim 8,
wherein said elastic body includes a shaft portion which is rotatably held by a body of the vehicle and an arm portion which extends from one of opposite end portions of said shaft portion in a direction intersecting said shaft portion and which is connected at a distal end portion thereof to a wheel holder holding a wheel of the vehicle,
and wherein said actuator is fixed to the body of the vehicle, and is configured to rotate said shaft portion about an axis of said shaft portion by the actuator force generated by said actuator.

10. The suspension system according to claim 8, wherein said actuator is configured to have a positive/negative efficiency product that is not larger than ½,
where the positive/negative efficiency product is defined as a product of a positive efficiency of said actuator and a negative efficiency of said actuator,
the positive efficiency is defined as a ratio of an amount of an external force acting on said actuator, to an amount of the motor force minimally required to cause the actuation of said actuator against the external force, and
the negative efficiency is defined as a ratio of an amount of the motor force minimally required to inhibit said actuator from being actuated by an external force acting on said actuator, to an amount of the external force.

11. The suspension system according to claim 8,
wherein said actuator includes a speed reducer configured to decelerate motion that is inputted from said electromagnetic motor, and is configured to output the decelerated motion as the actuation of said actuator,
and wherein said speed reducer has a speed ratio that is not higher than 1/100.

\* \* \* \* \*